(12) United States Patent
Takebe et al.

(10) Patent No.: US 8,015,203 B2
(45) Date of Patent: Sep. 6, 2011

(54) DOCUMENT RECOGNIZING APPARATUS AND METHOD

(75) Inventors: Hiroaki Takebe, Kawasaki (JP);
Noriaki Ozawa, Kawasaki (JP); Akihiro Minagawa, Kawasaki (JP); Yusaku Fujii, Kawasaki (JP); Yoshinobu Hotta, Kawasaki (JP); Hiroshi Tanaka, Kawasaki (JP); Katsuhito Fujimoto, Kawasaki (JP); Junichi Hirai, Kawasaki (JP); Seiji Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 527 days.

(21) Appl. No.: 12/265,753

(22) Filed: Nov. 6, 2008

(65) Prior Publication Data
US 2009/0125509 A1    May 14, 2009

(30) Foreign Application Priority Data

Nov. 9, 2007    (JP) ................. 2007-292618

(51) Int. Cl.
*G06F 7/00*     (2006.01)
*G06F 17/00*    (2006.01)
*G06F 17/30*    (2006.01)

(52) U.S. Cl. ......... 707/769; 707/602; 707/802; 707/828
(58) Field of Classification Search .................. None
See application file for complete search history.

(56) References Cited

U.S. PATENT DOCUMENTS

| | | | | |
|---|---|---|---|---|
| 5,228,100 A | * | 7/1993 | Takeda et al. | 382/175 |
| 6,754,654 B1 | * | 6/2004 | Kim et al. | 707/749 |
| 2004/0030726 A1 | * | 2/2004 | Baxter et al. | 707/104.1 |

FOREIGN PATENT DOCUMENTS

| | | |
|---|---|---|
| JP | 7-93469 A | 4/1995 |
| JP | 10-222612 A | 8/1998 |

OTHER PUBLICATIONS

"Chinese Office Action" mailed by Chinese Patent Office and corresponding to Chinese application No. 200810174109.1 on Dec. 22, 2010, with English translation.

* cited by examiner

*Primary Examiner* — Kuen Lu
*Assistant Examiner* — Loan T Nguyen
(74) *Attorney, Agent, or Firm* — Fujitsu Patent Center

(57) ABSTRACT

A document recognizing apparatus includes a display control unit which displays a document data including a character string related to a character string selected by a user, and an area that includes at least a character string of the document data.

10 Claims, 25 Drawing Sheets

| PRINCIPAL | NAME | FUJITSU TARO |
| | ADDRESS | 1-1-1, TSUKIJI, CHUO-KU |
| | TEL | 03-3333-3333 |

| OFFICE | ADDRESS | 4-1-1, KAMIODANAKA, NAKAHARA-KU, KAWASAKI-SHI |
| | TEL | 044-777-1111 |

FIG. 6

| TYPE | HEADING | ... |
|---|---|---|
| REPRESENTATIVE CHARACTER STRING | PRINCIPAL | ... |
| LOGICAL ELEMENT ID | 1 | ... |
| REPRESENTED CHARACTER STRING | HON-NIN, GO (CHINESE CHARACTER)-HON-NIN, GO-HON-NIN | ... |
| NUMBER OF REPRESENTED CHARACTER STRINGS | 3 | ... |
| POINTER TO PARENT | 00 | ... |
| POINTER TO CHILD | 01, 02, 03, 04 | ... |
| NUMBER OF CHILD | 4 | ... |

FIG. 8

| |
|---|
| LOGICAL ELEMENT ID |
| POINTER TO AREA CANDIDATE |
| NUMBER OF AREA CANDIDATES |

FIG. 9

| |
|---|
| AREA ID |
| COORDINATE |
| CHARACTER STRING |
| CHARACTER INFORMATION |
| NUMBER OF CHARACTERS |
| CANDIDATE RANK |

FIG. 10

| LOGICAL ELEMENT ID |
| --- |
| POINTER TO AREA CANDIDATE |
| NUMBER OF AREA CANDIDATES |
| SELECTION FLAG |
| SUB-SELECTION FLAG |
| SUB-SELECTION NUMBER |
| CANDIDATE CHANGE FLAG |
| DISPLAY FLAG |
| CONTRADICTION FLAG |

FIG. 11

| HIGHEST-ORDER LOGICAL ELEMENT |
| --- |
| IMAGE DISPLAY AREA |
| CORRECTION WINDOW DISPLAY ITEM |

FIG. 19

(b) CORRECTION WINDOW

• PRINCIPAL

NAME: FUJITSU TARO
ADDRESS: 1-1-1, TSUKIJI, CHUO-KU
TELEPHONE NUMBER: 044-777-1111

• OFFICE

ADDRESS: KAMIODANAKA, NAKAHARA-KU, KAWASAKI-SHI
TELEPHONE NUMBER: 03-3333-3333

(a) DOCUMENT IMAGE

| | NAME | FUJITSU TARO |
| PRINCIPAL | ADDRESS | 1-1-1, TSUKIJI, CHUO-KU |
| | TEL | 03-3333-3333 |
| | DATE OF BIRTH | MAY 5, 1980 |

| OFFICE | ADDRESS | 4-1-1, KAMIODANAKA, NAKAHARA-KU, KAWASAKI-SHI |
| | TEL | 044-777-1111 |

FIG. 20

(a) DOCUMENT IMAGE

| PRINCIPAL | NAME | FUJITSU TARO |
| | ADDRESS | 1-1-1, TSUKIJI, CHUO-KU |
| | TEL | 03-3333-3333 |
| | DATE OF BIRTH | MAY 5, 1980 |

| OFFICE | ADDRESS | 4-1-1, KAMIODANAKA, NAKAHARA-KU, KAWASAKI-SHI |
| | TEL | 044-777-1111 |

(b) CORRECTION WINDOW

· PRINCIPAL

NAME: FUJITSU TARO

ADDRESS: 1-1-1, TSUKIJI, CHUO-KU

TELEPHONE NUMBER: 044-777-1111

⇐ SELECT (CLICK)

· OFFICE

ADDRESS: KAMIODANAKA, NAKAHARA-KU, KAWASAKI-SHI

TELEPHONE NUMBER: 03-3333-3333

FIG. 21

(a) DOCUMENT IMAGE

| PRINCIPAL | NAME | FUJITSU TARO |
| | ADDRESS | 1-1-1, TSUKIJI, CHUO-KU |
| | TEL | 03-3333-3333 |
| | DATE OF BIRTH | MAY 5, 1980 |

| OFFICE | ADDRESS | 4-1-1, KAMIODANAKA, NAKAHARA-KU, KAWASAKI-SHI |
| | TEL | 044-777-1111 |

(b) CORRECTION WINDOW

• PRINCIPAL
- NAME: FUJITSU TARO
- ADDRESS: 1-1-1, TSUKIJI, CHUO-KU
- TELEPHONE NUMBER: 044-777-1111 ← CLICK
- 03-3333-3333

• OFFICE
- ADDRESS: KAMIODANAKA, NAKAHARA-KU, KAWASAKI-SHI
- TELEPHONE NUMBER: 03-3333-3333

FIG. 23

(a) DOCUMENT IMAGE

| PRINCIPAL | NAME | FUJITSU TARO |
| | ADDRESS | 1-1-1, TSUKIJI, CHUO-KU |
| | TEL | 03-3333-3333 |
| | DATE OF BIRTH | MAY 5, 1980 |

| OFFICE | ADDRESS | 4-1-1, KAMIODANAKA, NAKAHARA-KU, KAWASAKI-SHI |
| | TEL | 044-777-1111 |

(b) CORRECTION WINDOW

• PRINCIPAL

NAME: FUJITSU TARO
ADDRESS: 1-1-1, TSUKIJI, CHUO-KU
TELEPHONE NUMBER: 03-3333-3333

• OFFICE

ADDRESS: KAMIODANAKA, NAKAHARA-KU, KAWASAKI-SHI
TELEPHONE NUMBER: 03-3333-3333

FIG. 25

(a) DOCUMENT IMAGE

| PRINCIPAL | NAME | FUJITSU TARO |
| | ADDRESS | 1-1-1, TSUKIJI, CHUO-KU |
| | TEL | 03-3333-3333 |
| | DATE OF BIRTH | MAY 5, 1980 |

| OFFICE | ADDRESS | 4-1-1, KAMIODANAKA, NAKAHARA-KU, KAWASAKI-SHI |
| | TEL | 044-777-1111 |

(b) CORRECTION WINDOW

· PRINCIPAL

NAME: FUJITSU TARO

ADDRESS: 1-1-1, TSUKIJI, CHUO-KU

TELEPHONE NUMBER: 03-3333-3333

· OFFICE

ADDRESS: KAMIODANAKA, NAKAHARA-KU, KAWASAKI-SHI

TELEPHONE NUMBER: 044-777-11|1

DOCUMENT RECOGNIZING APPARATUS AND METHOD

CROSS-REFERENCE TO RELATED APPLICATIONS

This application claims the benefit of priority from Japanese Patent Application No. 2007-292618 filed on Nov. 9, 2007, which is herein incorporated by reference in its entirety.

BACKGROUND

Example embodiments discussed herein are related to a recording medium including a logical-structure-model storing section that stores the logical structure indicating logical elements in various documents and a relation between the logical elements and having recorded therein a document recognizing program for recognizing the logical structure of an inputted and recognized document according to the logical structure stored in the logical-structure-model storing section, a document recognizing apparatus including the logical-structure-model storing section, and a document recognizing method for the document recognizing apparatus.

Conventionally, there is a document data input system that prepares, for each form of a document, a layout definition describing position information of data desired to be extracted and recognizes, with an OCR, tagged data using the layout definition after identifying the form of the document. Specifically, plural sets of two coordinates representing a tag name a rectangular area are written on a document. For example, a tag corresponding to data "Fujitsu Taro" is "name of a principal" of an educational institution such as a school.

This document data input system displays, side by side, an inputted document image and a recognition result obtained by recognizing the document image using the layout definition. A user compares the document image and the recognition result and determines whether the recognition result is correct. When the recognition result is wrong, the user deletes the recognition result once and inputs a correct value with a keyboard or the like.

However, with such a method, because the user compares the document image and the recognition result and determines whether the recognition result is correct, a burden on the user is large in terms of reading. Moreover, artificial mistakes may not be prevented. Therefore, various techniques for reducing a burden of data correction work when there is an error in a read document in such a data input system have been disclosed.

For example, a data input system that automatically generates a layout image of a document corresponding to a place of an error that occurs in document recognition processing is conceivable. Specifically, the data input system analyzes, according to layout information for designating a layout of a document to be read, a layout of a document image of a read document and performs character recognition of respective reading objects determined by this layout analysis. The data input system detects a layout analysis error from result data of this character recognition and the layout information and screen-displays a document image corresponding to the error occurrence place.

However, the technique described above has a problem in that a burden of the data correction work may not always be reduced and, to the contrary, the burden may increase.

Specifically, because the document image corresponding only to the error occurrence place is displayed, when this document image is enlarged and displayed, it may be unclear as to the location in this document where, i.e., at which character string, the document error is. In particular, when headings of the same character string are present in the document, those character strings have to be distinguished. As a result, the user has to reduce and display the enlarged image once to make it possible to check an image around the image. This increases the burden on the user to the contrary.

With the technique described above, the error in reading the document is simply displayed to the user. It is impossible to display to the user whether the displayed error is properly corrected. In other words, even if the user manually corrects the error occurrence place on the basis of the document image corresponding to the error occurrence place, content of the correction is not always correct. The user himself/herself needs to visually check the correction content. Therefore, it is hard to say that it is possible to reduce the burden of the data correction work.

SUMMARY

According to an aspect of the invention, an apparatus includes a logical-structure-model storing section that stores a logical structure indicating logical elements in various documents and a relation among the logical elements, the document recognizing apparatus recognizing logical structure of an inputted and recognized document according to the logical structure stored in the logical-structure-model storing section. The document recognizing apparatus has a memory such as a document-data storing mechanism that stores, as document data, character strings on the document and association of the characters on the document and a relation among logical elements stored in the logical-structure-model storing section, document-data storage procedural mechanism or module that extracts, with respect to a document image obtained by recognizing the inputted document, character strings coinciding with the logical elements stored in the logical-structure-model storing section, stores the character strings in the document-data storing mechanism, extracts a combination of character strings on the document satisfying the relation among the logical elements stored in the logical-structure-model storing section, and stores association of the character strings on the document and the relation among the logical elements stored in the logical-structure-model storing section in the document-data storing mechanism, and display control mechanism that outputs the document data stored in the document-data storing mechanism and the recognized document image to a display unit, when a character string of the document data displayed on the display unit is selected by a user, specifies a character string related to the selected character string from the document-data storing mechanism, displays document data in which the specified character string is distinguished from the other character strings on the display unit, and displays a minimum area including the specified character string of the document data of the document image on the display unit.

Other features and advantages of embodiments of the invention are apparent from the detailed specification and, thus, are intended to fall within the scope of the appended claims. Further, because numerous modifications and changes will be apparent to those skilled in the art based on the description herein, it is not desired to limit the embodiments of the invention to the exact construction and operation illustrated and described, and accordingly all suitable modifications and equivalents are included.

BRIEF DESCRIPTION OF THE DRAWINGS

FIG. 6 is a diagram showing the data structure of respective logical elements configuring the logical structure stored in the logical structure model DB according to an example embodiment of the present invention;

FIG. 8 is a diagram showing an example of information stored in logical result data according to an example embodiment of the present invention;

FIG. 9 is a diagram showing an example of information stored in area information according to an example embodiment of the present invention;

FIG. 10 is a diagram showing an example of information stored in control information according to an example embodiment of the present invention;

FIG. 11 is a diagram showing an example of information stored in display information according to an example embodiment of the present invention;

FIG. 19 is a diagram showing an example of a displayed screen according to an example embodiment of the present invention;

FIG. 20 is a diagram showing a screen selected by a user according to an example embodiment of the present invention;

FIG. 21 is a diagram showing a screen on which logical element candidates are illustrated according to an example embodiment of the present invention;

FIG. 23 is a diagram showing an example in which a contradictory item is found according to an example embodiment of the present invention;

FIG. 25 is a diagram showing an example in which the correction is completed according to an example embodiment of the present invention;

DETAILED DESCRIPTION OF EXAMPLE EMBODIMENTS

A recording medium having a document recognizing program recorded therein, a document recognizing apparatus, and a document recognizing method according to an example embodiment of the present invention are explained in detail below with reference to the accompanying drawings. In the following explanation, an overview and characteristics of the document recognizing apparatus according to the example embodiment and a configuration and a flow of processing of the document recognizing apparatus are explained in order. Lastly, various modifications to the example embodiment to provide other example embodiments are explained.

Figure 1:
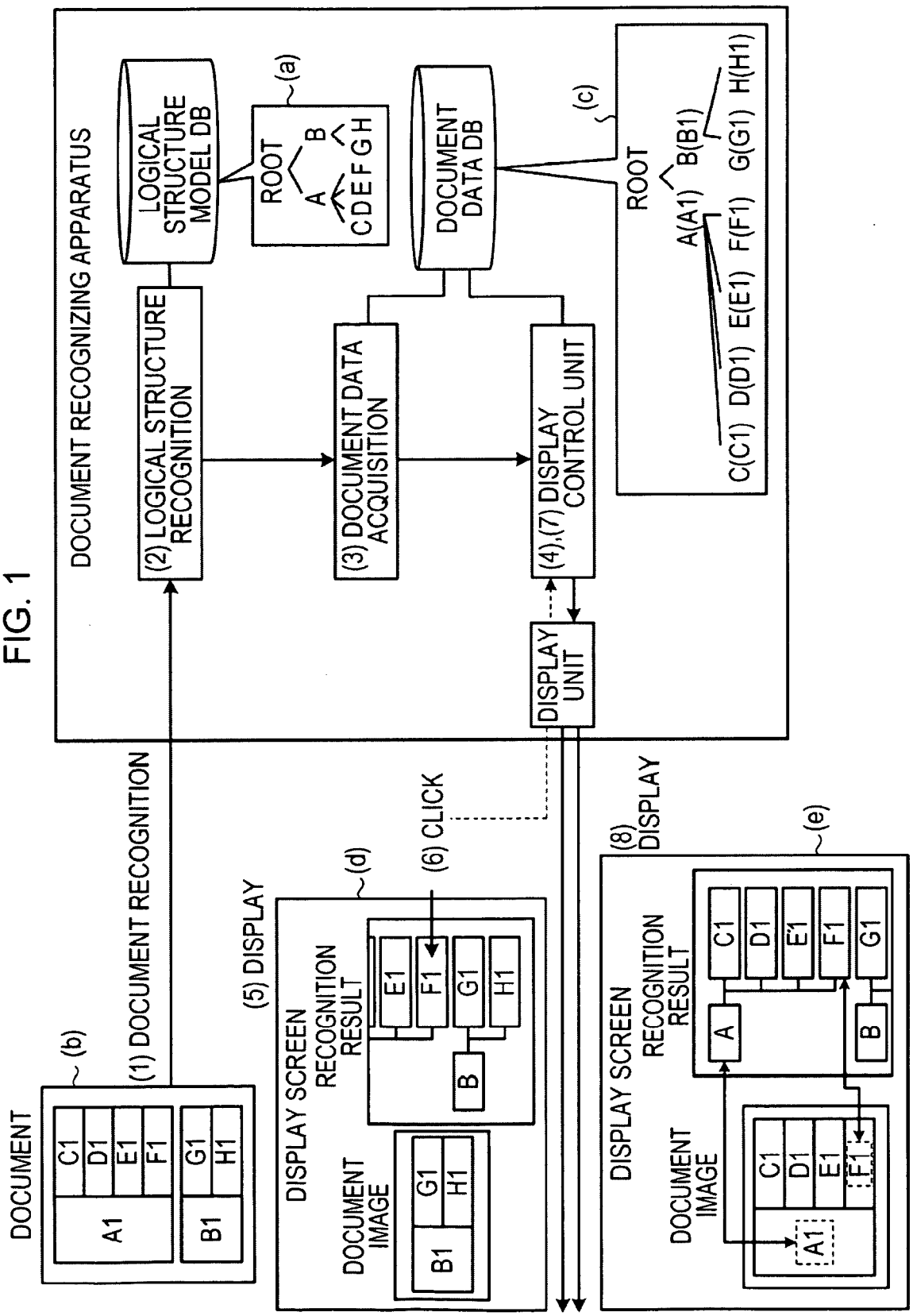
FIG. 1 is a system diagram showing an overall configuration of a document recognizing apparatus according to an example embodiment of the present invention.

First, an overview and characteristics of a document recognizing apparatus according to a first example embodiment of the present invention are explained with reference to FIG. 1. FIG. 1 is a system diagram showing an overall configuration of the document recognizing apparatus according to the first example embodiment.

The document recognizing apparatus shown in FIG. 1 includes a logical structure model database (DB) that stores the logical structure indicating logical elements in various documents (e.g., a settlement of account document, an accounting document, and a personnel document) and a relation among the logical elements and an OCR (Optical Character Recognition) for converting an image of a typed document into a format (a string of character codes) that can be edited by a computer.

An example of information stored in the logical structure model DB is specifically explained. The logical structure model DB stores, according to a type of a document, logical elements and a relation among the logical elements and further stores character strings in the logical elements. The stored logical elements have attributes of headings and data. A correspondence relation between the headings and the data, a hierarchical relation among the headings, and the like are represented in the tree structure (see (a) in FIG. 1). Character strings represented on the document are stored in the logical elements. "A" and "B" shown in (a) in FIG. 1 are headings of the logical elements and "C" to "H" are data of the logical elements.

The document recognizing apparatus displays, side by side, a document image scanned by the OCR and a scanned original document image on a display unit such as a display. The document recognizing apparatus causes a user to check whether read data is correct. When the data is correct, the document recognizing apparatus captures the document data and executes various kinds of processing. A document as an object of processing in this example embodiment may be a paper medium scanned by the OCR, an electronic file (electronic data) received from a network, a storage medium, or the like.

In such a configuration, as an overview of the document recognizing apparatus according to the first example embodiment, as described above the document recognizing apparatus includes the logical structure model DB that stores a logical structure indicating logical elements in various documents and a relation among the logical elements. The document recognizing apparatus recognizes the logical structure of an inputted and recognized document according to the logical structure stored in the logical structure model DB. In particular, the document recognizing apparatus has a main characteristic in that it is possible to reduce a burden on a correction operator in correction work for recognized document data.

This main characteristic is explained specifically. The document recognizing apparatus includes association of a document data DB that stores, as document data, character strings on a document and a relation between the character strings on the document and the logical elements stored in the logical structure model DB. As a specific example, the document data DB stores information in which character strings on an inputted document are associated with the relation among the logical elements stored in the logical structure model DB.

The document recognizing apparatus recognizes the inputted document and extracts character strings coinciding with the logical elements stored in the logical structure model DB and stores the character strings in the document data DB. The document recognizing apparatus extracts a combination of character strings on the document satisfying the relation among the logical elements stored in the logical structure model DB and stores, in the document data DB, association of the character strings on the document and the relation among the logical elements stored in the logical structure model DB ((1) to (3) in FIG. 1).

Specifically, in the example described above, the document recognizing apparatus receives an input document including heading character strings "A1" and "B1" of layout elements shown in (b) in FIG. 1 and data character strings "C1" to "H1" of the layout elements. In this case, the document recognizing apparatus extracts the heading character strings "A1" and "B1" and the data character strings "C1" to "H1" of the input document and stores the character strings in the document data DB. Subsequently, the document recognizing apparatus extracts a combination of character strings on the document that satisfies headings of the logical elements and the data stored in the logical structure model DB and stores, in the document data DB, association of the character strings on the document and the relation among the logical elements stored in the logical structure model DB (see (a) in FIG. 1) as shown in (c) in FIG. 1.

The document recognizing apparatus displays the document data stored in the document data DB and the recognized document image on the display unit (see (4) and (5) in FIG. 1). Specifically, in the example described above, the document recognizing apparatus outputs the document data stored in the document data DB and the recognized document image to the display unit as shown in (d) in FIG. 1.

Thereafter, when a character string of the document data displayed on the display unit is selected by the user, the document recognizing apparatus specifies a character string related to the selected character string from the document data DB and displays, on the display unit, document data in which the specified character string is distinguished from other character strings. The document recognizing apparatus displays a minimum area (image) including the specified character string of the document data in the document image on the display unit (see (6) to (8) in FIG. 1).

Specifically, in the example described above, when the place of "F1" in the recognition result is clicked by the user on the screen of (d) in FIG. 1, the document recognizing apparatus specifies a heading "A1" and data "F1" of the heading related to the selected character string "F1" from the document data DB. As shown in (e) in FIG. 1, the document recognizing apparatus displays, on the display unit, document data in which the specified "A1, F1" is distinguished from other character strings "B1". The document recognizing apparatus displays a minimum image including specified "A1, F1" of the document data in the document image on the display unit.

In this way, when the user selects a character string that the user desires to check or correct, the document recognizing apparatus according to the first example embodiment can specify and display at a place where a character string related to the selected character string is included. As a result, as indicated by the main characteristic, it is possible to reduce a burden on a correction operator in correction work for recognized document data.

Figure 2:
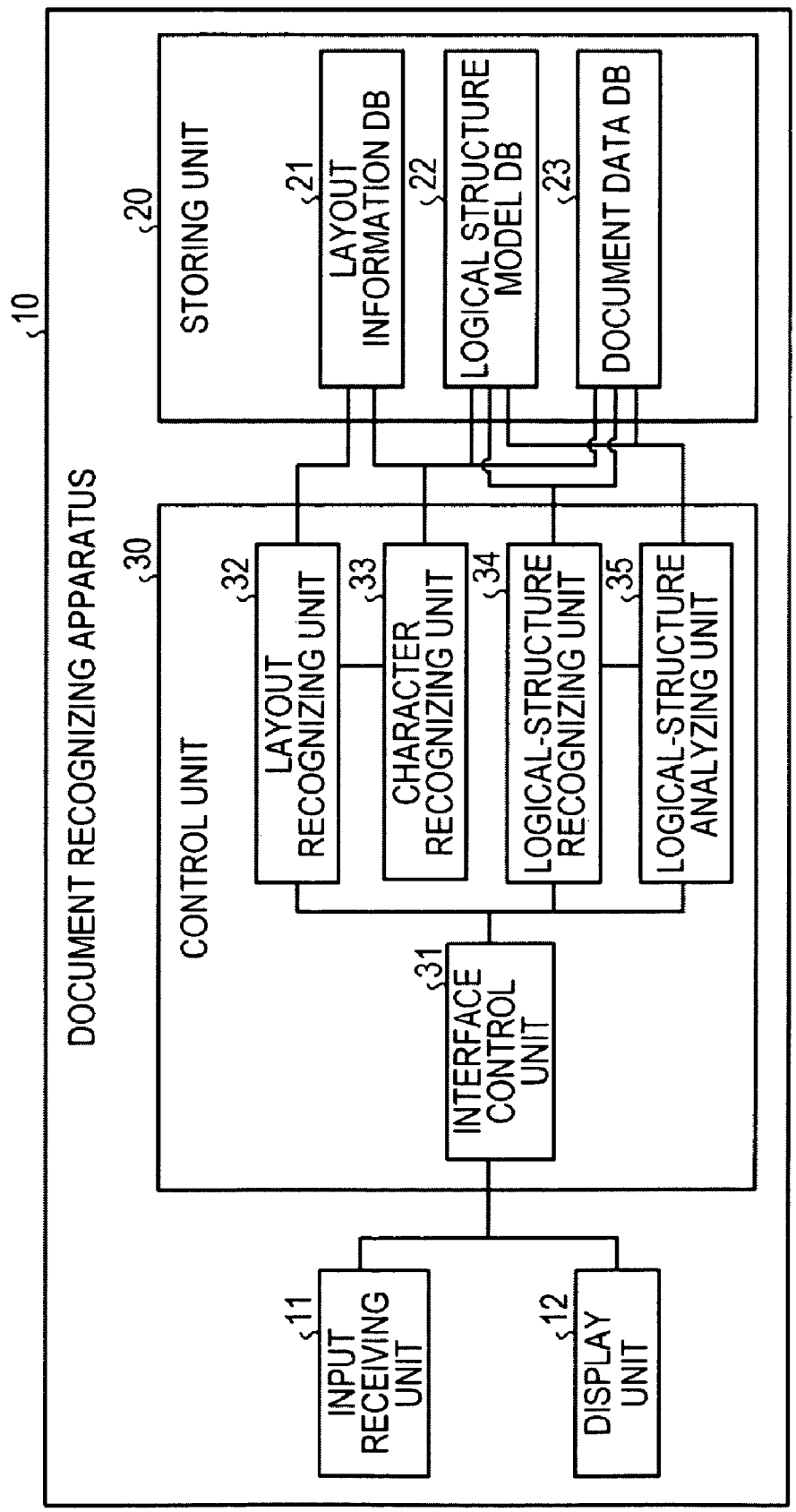
FIG. 2 is a block diagram showing a configuration of a document recognizing apparatus according to an example embodiment of the present invention.

A configuration of the document recognizing apparatus shown in FIG. 1 is explained with reference to FIG. 2. FIG. 2 is a block diagram showing a configuration of the document recognizing apparatus according to an example embodiment. As shown in FIG. 2, this document recognizing apparatus 10 includes an input receiving unit 11, a display unit 12, a storing unit 20, and a control unit 30.

The input receiving unit 11 includes an OCR and receives various documents. As a specific example, the input receiving unit 11 receives a document image of a paper medium and scans the document image with the OCR or receives document image data in a file format through a network, various storage media, or the like. The input receiving unit 11 outputs the received data to an interface control unit 31 described later.

Figures 3, 4:
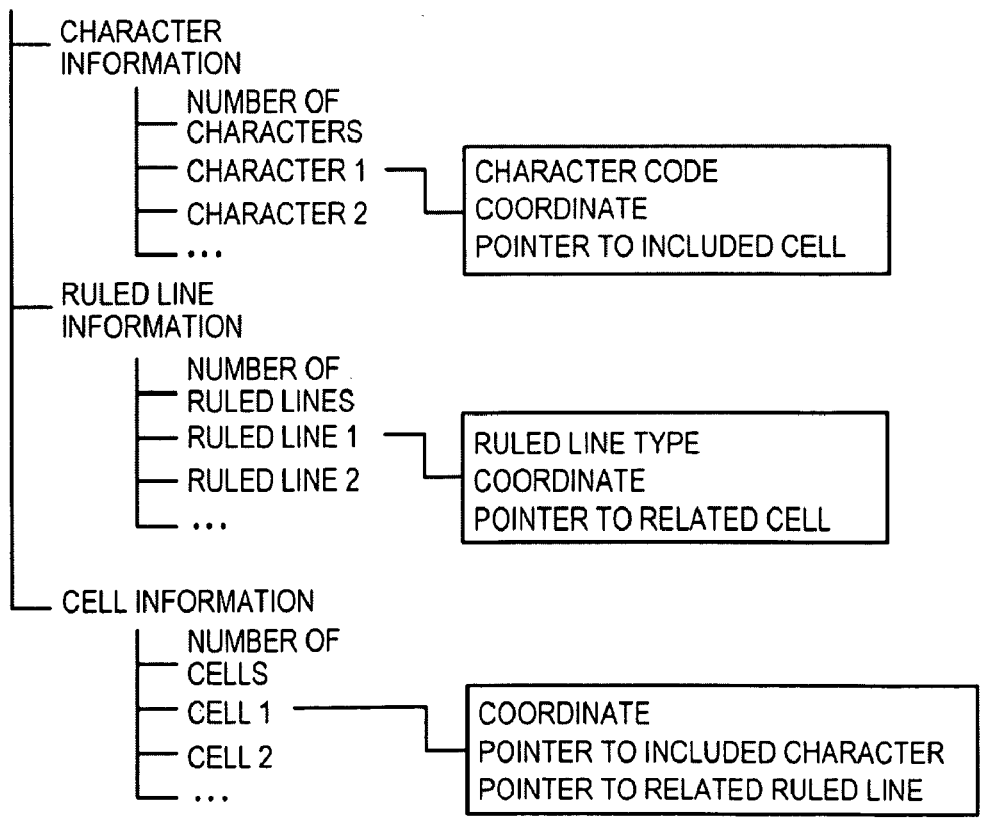
FIG. 3 is a diagram showing a displayed document image and document data according to an example embodiment of the present invention.
FIG. 4 is a diagram showing an example of information stored in a layout information DB according to an example embodiment of the present invention.

The display unit 12 includes a monitor (or a display or a touch panel) and a speaker and outputs various kinds of information. For example, the display unit 12 displays, according to instruction control by the interface control unit 31 or a logical-structure analyzing unit 35 described later, document data or the like received by the input receiving unit 11 shown in FIG. 3. FIG. 3 is a diagram showing a displayed document image and document data.

The storing unit 20 stores data and programs to run various kinds of processing by the control unit 30. In particular, as units closely related to the present invention, the storing unit 20 includes a layout information DB 21, a logical structure model DB 22, and a document data DB 23.

The layout information DB 21 stores character information including character codes and coordinates and layout information including ruled lines and coordinates of cells. As a specific example, as shown in FIG. 4, the layout information DB 21 stores layout information including character information, ruled line information, and cell information. In the character information, the number of characters and information on each of characters are written. In the information on each of characters, a character code and a coordinate and a pointer to a cell including the character are written. In the ruled line information, the number of ruled lines and information on each of ruled lines are written. In the information on each of ruled lines, a ruled line type such as a solid line or a dotted line and a coordinate and a pointer to a cell formed by the ruled line are written. In the cell information, the number of cells and information on each of cells are written. In the information on each of cells, a coordinate, a pointer to a character included in the cell, and a pointer to a ruled line forming the cell are written. FIG. 4 is a diagram showing an example of the information stored in the layout information DB.

The logical structure model DB 22 stores the logical structure indicating logical elements in various documents and a relation among the logical elements. As a specific example, as shown in FIG. 5, the logical structure model DB 22 has attributes of headings and data and stores the logical structure representing, in the tree structure, logical elements including plural character strings represented on a document, a correspondence relation between the headings and the data, a hierarchical relation among the headings, and the like.

Figure 5:
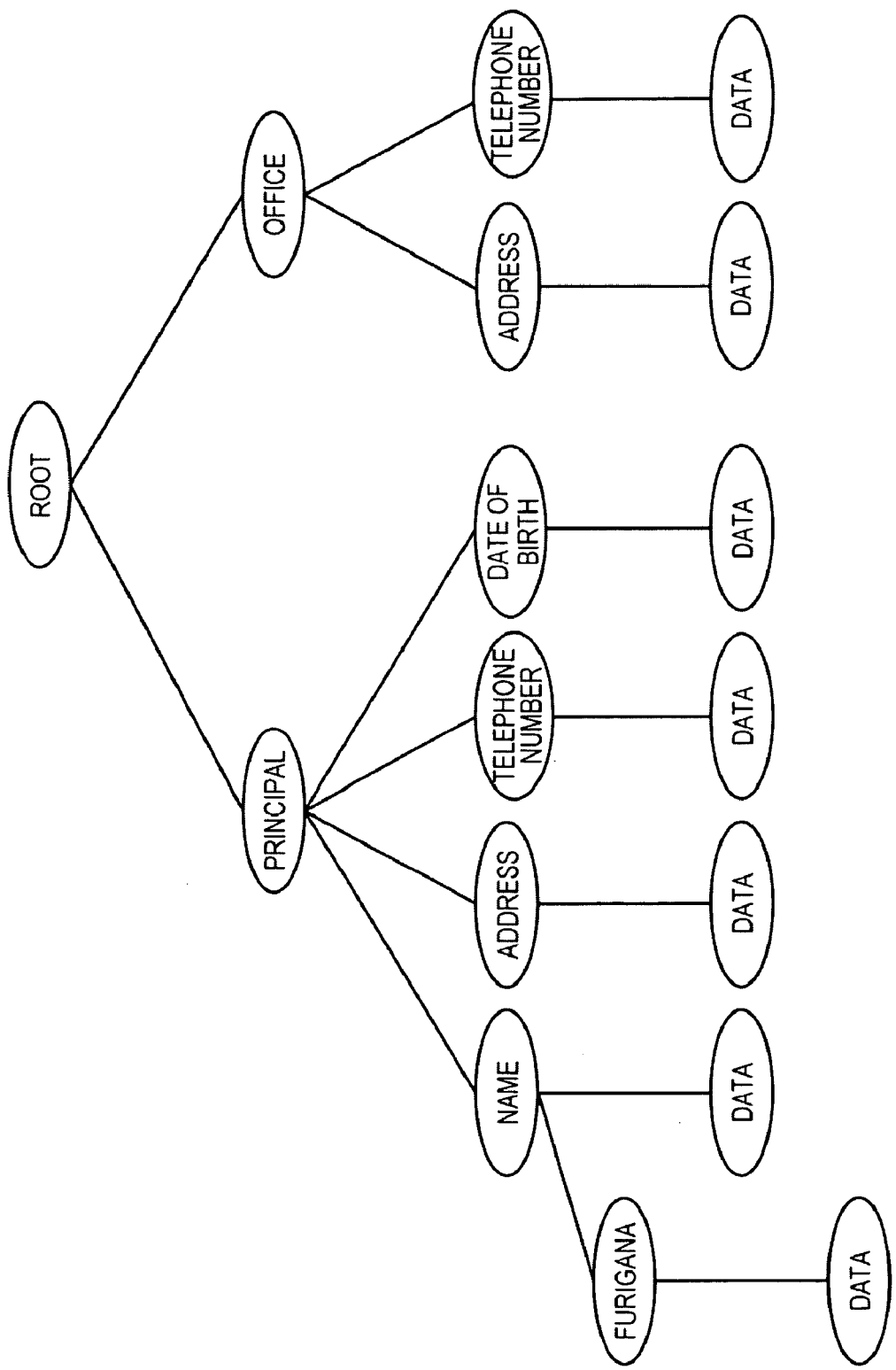
FIG. 5 is a diagram showing the logical structure stored in a logical structure model DB according to an example embodiment of the present invention.

The respective elements shown in FIG. 5 have the data structure shown in FIG. 6. "Type" represents a heading or data. "Representative character string" is, for example, (hon-nin), (simei), or the like. A logical element ID is an ID uniquely allocated in the logical structure as a logical structure model. A represented character string represents a character string represented on a registered document. A parent is a high-order logical element in the tree structure representing the logical structure of the logical structure model. A child is a low-order logical element. For example, a logical element "hon-nin" is explained as an example. The logical structure model DB 22 stores the data structure "a type, a representative character string, a logical element ID, a represented character string, the number of represented character strings, a point to a parent, a pointer to a child, and the number of children" of the logical element "hon-nin" as "midashi, hon-nin, 1, hon-nin, go-hon-nin, go(in Chinese character)-hon-nin, 3, 00, 01, 02, 03, 03, and 4" or the like. FIG. 5 is a diagram showing the logical structure stored in the logical structure model DB. FIG. 6 is a diagram showing the data structure of the logical elements forming the logical structure stored in the logical structure model DB.

The document data DB 23 stores, as document data, characters strings on a document and association of the character strings on the document and the relation among the logical elements stored in the logical structure model DB 22. As a specific example, the document data DB 23 associates the logical structure (see FIG. 5) of the tree structure stored in the logical structure model DB 22 and the character strings on the document and stores a logical structure association result 22a shown in FIG. 7. The document data DB 23 stores the data structure shown in FIGS. 8 to 11 with respect to the associated logical elements.

Figure 7:
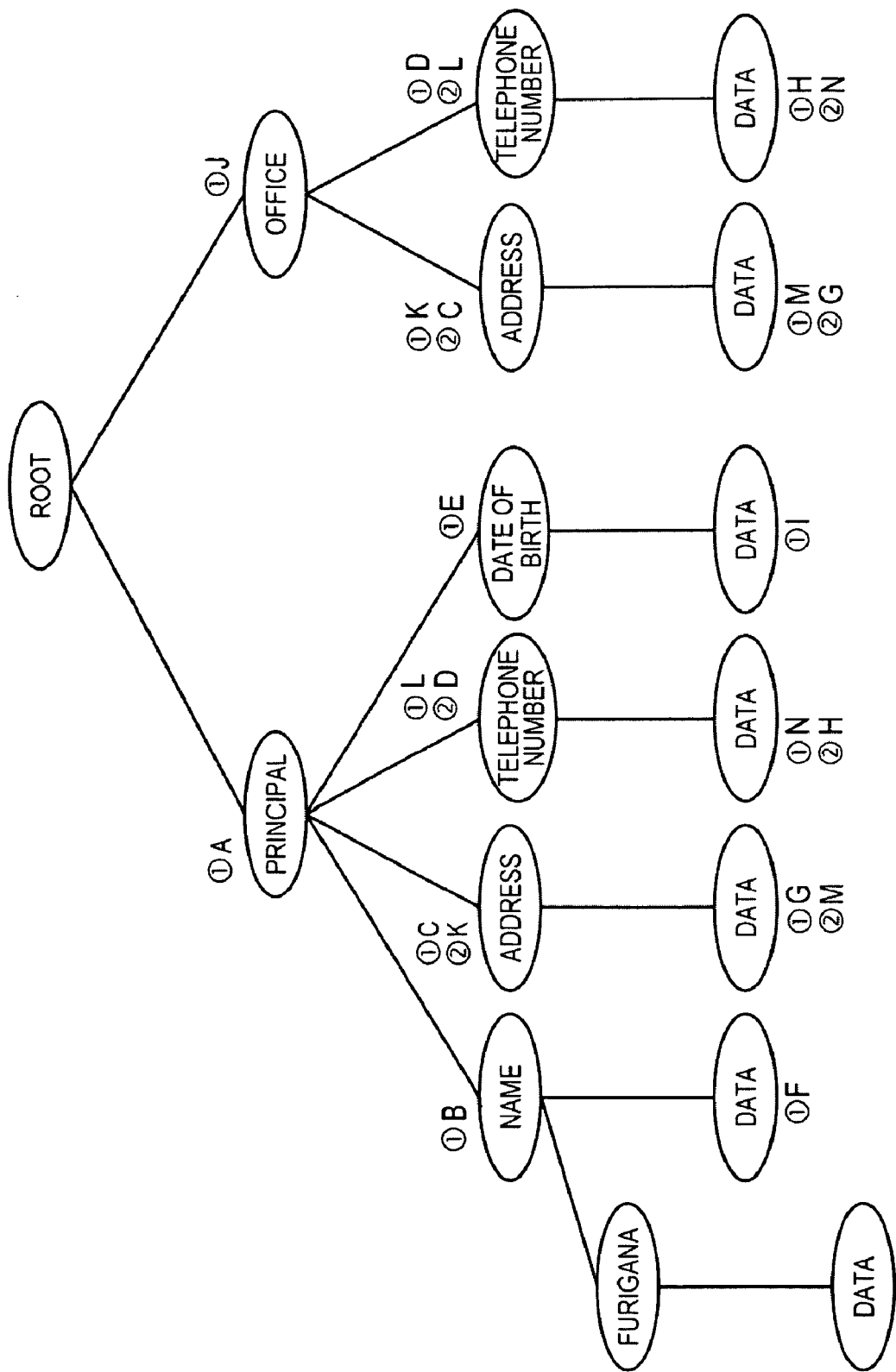
FIG. 7 is a diagram showing an example of a logical structure association result stored in a document data DB according to an example embodiment of the present invention.

The respective databases are specifically explained. First, the document data DB 23 stores logical result data 23b as a result of association of layout elements (character strings) on a document and the logical elements in the logical structure shown in FIG. 5. The logical result data 23b includes "logical element ID" uniquely allocated to a logical element, "pointer to an area candidate" for specifying a layout element on the document associated with the logical element, and "the number area candidates" indicating the number of area candidates on the document associated with the logical element. Referring to FIG. 7 as an example, the document data DB 23 stores, as the logical result data 23b, "logical element ID, pointer to an area candidate, and the number of area candidates" as "01 (principal), 00a, and 1", "001 (address), 00b/00k, and 2", or the like. In the example shown in FIG. 7, one area on the document corresponds to area candidates for plural logical elements. Twenty-two area candidate data correspond to seventeen logical elements. The pointer to an area candidate is information such as an address for specifying a logical element. One example of the pointer to an area candidate is described here. The pointer to an area candidate is not limited to this example.

The data structure shown in FIG. 9 is explained. The document data DB 23 stores area information 23c shown in FIG. 9 associated with each of the logical elements associated in FIG. 7. The area information 23c stores "area ID" uniquely allocated to an area on a document including logical information, "coordinate" indicating a position on the document where the logical element is present, "character string" indicating the logical element, "character information" indicating information concerning the character string indicating the logical element, "the number of characters" forming the logical element, "candidate rank" indicating possibility that the logical element is an associated logical element, and the like. The "candidate rank" is set when, on a scanned document image, there are plural candidates corresponding to "address" and "telephone number" subordinate to the element "principal" in FIG. 7. For example, the document data DB 23 stores, as the area information 23c, "area ID, coordinate, character string, character information, the number of characters, and candidate rank" as "01, 100. 120, hon-nin, book (0x967B), person (0x906C), 2, and 1" or the like.

The document data DB 23 further stores control information 22d shown in FIG. 10 in association with each of the logical elements associated in FIG. 7. The control information 22d includes "logical element ID" uniquely allocated to the logical element, "pointer to an area candidate" for specifying a logical element on a document associated with the logical element, "the number of area candidates" indicating the number of area candidates on the document associated with the logical element, "selection flag" that is a flag representing whether the user selects an area candidate and has ON or OFF as a value, "sub-selection flag" that is a flag representing whether the user selects an area candidate and has ON or OFF as a value, "sub-selection number" representing to which rank of selection candidates the selected area candidate corresponds, "candidate change flag" that is a flag representing that a recognition result is changed and has NOW, PAST, or OFF as a value, "display flag" that is a flag representing whether the recognition result should be displayed on a screen and has ON or OFF as a value, and "contradiction flag" that is a flag representing whether there is contradiction and has ON or OFF as a value. For example, the document data DB 23 stores, as the control information 22d, "logical element ID, pointer to an area candidate, the number of area candidates, selection flag, sub-selection flag, sub-selection number, candidate change flag, display flag, and contradiction flag" as "01 (principal), 00a, 1, ON, ON, 1, ON, OFF, and ON" or the like.

The document data DB 23 further stores the display information 22e shown in FIG. 11 in association with each of the logical elements associated in FIG. 7. The display information 22e includes "highest-order logical element" representing a highest-order logical element without a root as a logical element ID, "image display area" representing a display area in a scanned document image as a coordinate, and "correction window display item" representing a display item of a correction window, in which read document data is displayed, as a set of logical element IDs. For example, the document data DB 23 stores, as display information 22*e*, "highest-order logical element, image display area, and correction window display item" as "01 (principal), 300×200, 01 (principal). 001 (001)" or the like.

FIG. 7 is a diagram showing an example of the logical structure association result 22*a* stored in the document data DB 23. FIG. 8 is a diagram showing an example of information stored in the logical result data 23*b*. FIG. 9 is a diagram showing an example of information stored in the area information 23*c*. FIG. 10 is a diagram showing an example of information stored in the control information 22*d*. FIG. 11 is a diagram showing an example of information stored in the display information 22*e*.

The control unit 30 includes an internal memory for storing control programs such as an OS (Operating System), programs defining various processing procedures and the like, and required data. In particular, as units closely related to the present invention, the control unit 30 includes an interface control unit 31, a layout recognizing unit 32, a character recognizing unit 33, a logical-structure recognizing unit 34, and a logical-structure analyzing unit 35. The control unit 30 executes various kinds of processing using these units. Detailed processing by the respective functional units in the control unit 30 is specifically explained with reference to FIG. 14 and subsequent figures later. Therefore, an overview of the respective functional units is explained here.

The interface control unit 31 receives operation by the user from the display unit 12 and displays a result of analysis of the logical structure by the logical-structure analyzing unit 35 described later on the display unit 12. Specifically, the interface control unit 31 outputs a document received by the input receiving unit 11 to the layout recognizing unit 32 as a document image, displays a recognition result of a document recognized by the logical-structure recognizing unit 34 on the display unit 12 as a correction window, receives operation by the user such as click from the display unit 12 and outputs operation content to the logical-structure analyzing unit 35, and displays display content changed according to a received result of the operation by the user on the display unit 12.

The layout recognizing unit 32 recognizes a layout of a document received by the input receiving unit 11. Specifically, the layout recognizing unit 32 receives the document, which is received by the input receiving unit 11, via the interface control unit 31, identifies a type of the received document, specifies layout information stored in the layout information DB 21, and analyzes a layout corresponding to the identified type of the document on the basis of the specified layout information. The layout recognizing unit 32 outputs a result of the analysis to the character recognizing unit 33 described later.

The character recognizing unit 33 recognizes character strings on the document received by the input receiving unit 11. Specifically, the character recognizing unit 33 receives a recognition result of the layout recognized by the layout recognizing unit 32. The character recognizing unit 33 extracts, on the basis of the layout information specified by the layout recognizing unit 32 and stored in the layout information DB 21 and the logical structure stored in the logical structure model DB 22 corresponding to the type of the document specified by the layout recognizing unit 32, a character string on the document received by the input receiving unit 11 and stores a result of the extraction in the document data DB 23.

Figure 12:
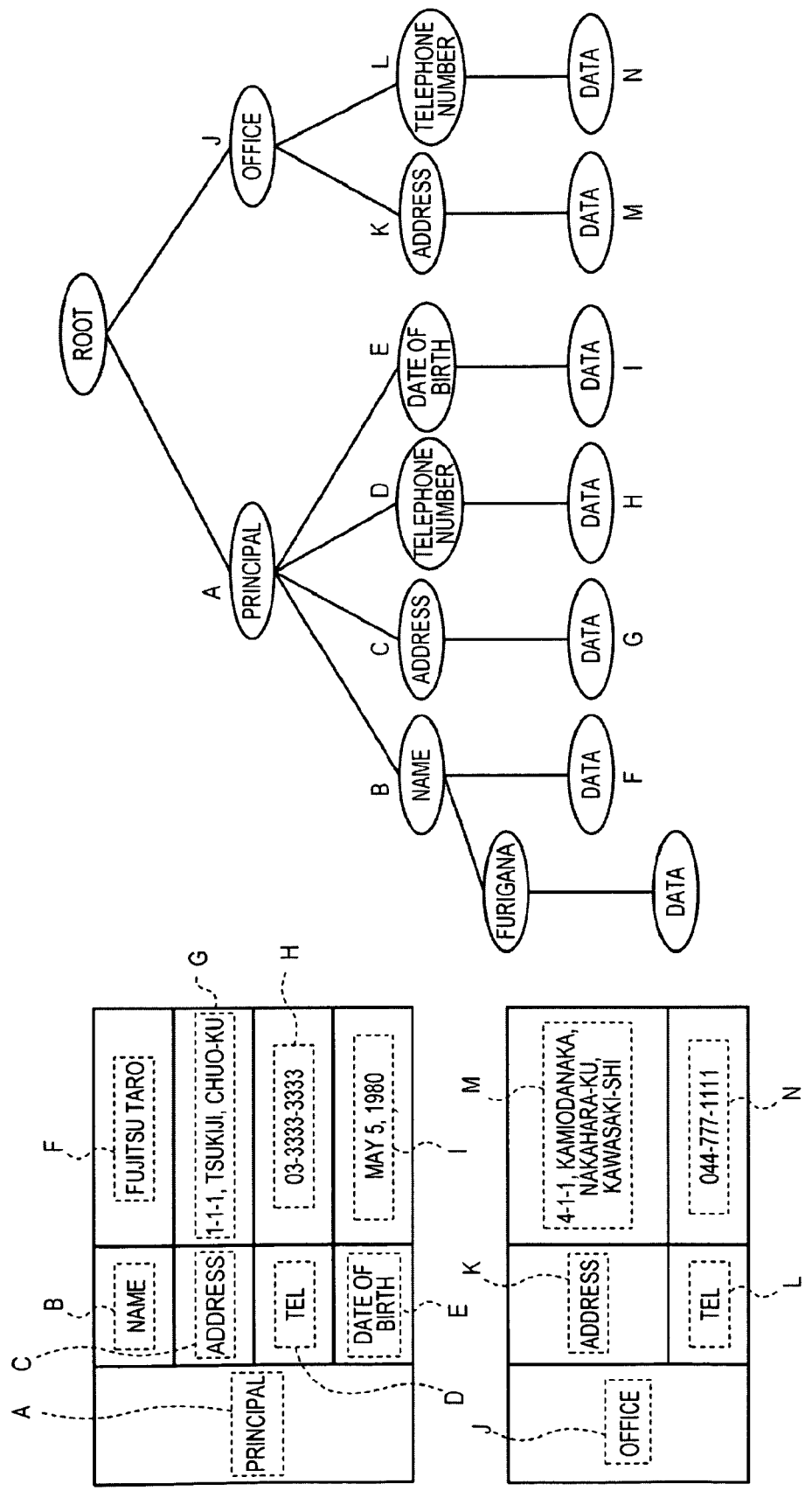
FIG. 12 is a diagram showing an example of a correspondence relation among logical elements according to an example embodiment of the present invention.
Figure 13:
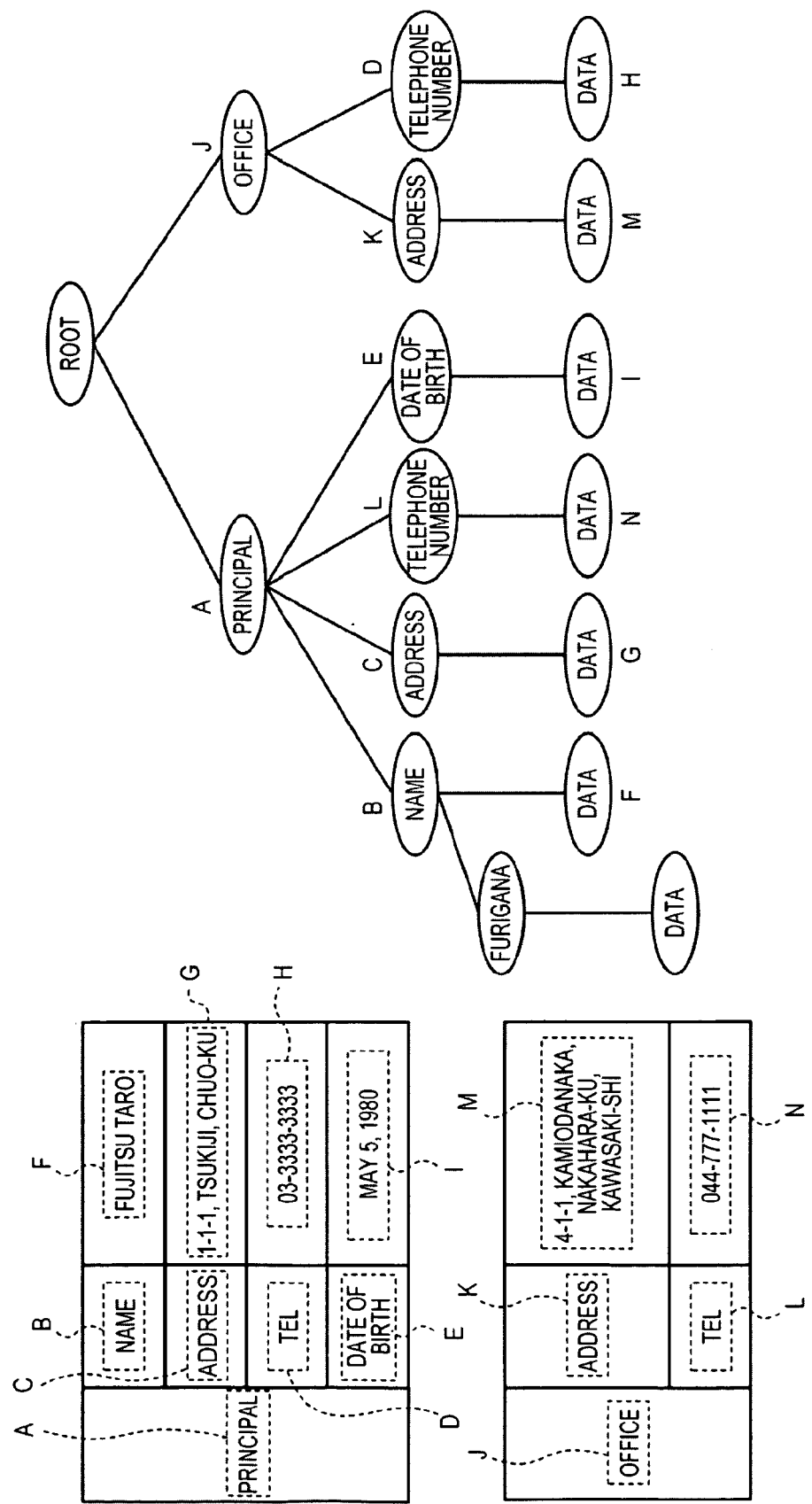
FIG. 13 is a diagram showing the example of the correspondence relation among the logical elements according to an example embodiment of the present invention.

The logical-structure recognizing unit 34 recognizes the logical structure of the character strings on the document received by the input receiving unit 11. Specifically, the logical-structure recognizing unit 34 receives a recognition result of the layout recognized by the layout recognizing unit 32. The logical-structure recognizing unit 34 extracts a combination of character strings on the document satisfying the relation among the logical elements stored in the logical structure model DB 22 and stores, in the document data DB 23, association of the character strings on the document and the relation among the logical elements stored in the logical structure model DB 22 as shown in FIGS. 12 and 13. As a method of outputting plural candidates in a logical structure recognition result, for example, a method of rearranging, for each k1, posterior probabilities pp1 (i1, j1, k1) calculated for logical elements (i1, j1) in the order of magnitude and outputting the posterior probabilities may be used. A method of arranging cliques outputted in a result of matching with the relation among the logical elements stored in the logical structure model DB 22 in order of an evaluation value and adopting the cliques in first and second ranks to be candidates may be used. FIGS. 12 and 13 are diagrams showing examples of a correspondence relation among logical elements.

The logical-structure analyzing unit 35 controls the display unit 12 to display a recognition result of a document as a correction window. Specifically, the logical-structure analyzing unit 35 outputs, on the basis of the character strings on the document received by the input receiving unit 11 and stored in the document data DB 23 and the relation among the logical elements associated with the character strings, a display control instruction for displaying a document recognition result as a correction window to the interface control unit 31. The logical-structure analyzing unit 35 analyzes the relation among the logical elements on the basis of the user operation (user action) received by the interface control unit 31. The logical-structure analyzing unit 35 outputs a display control instruction for displaying correction content of the document analysis result by received user operation as a correction window to the interface control unit 31.

Figure 14:
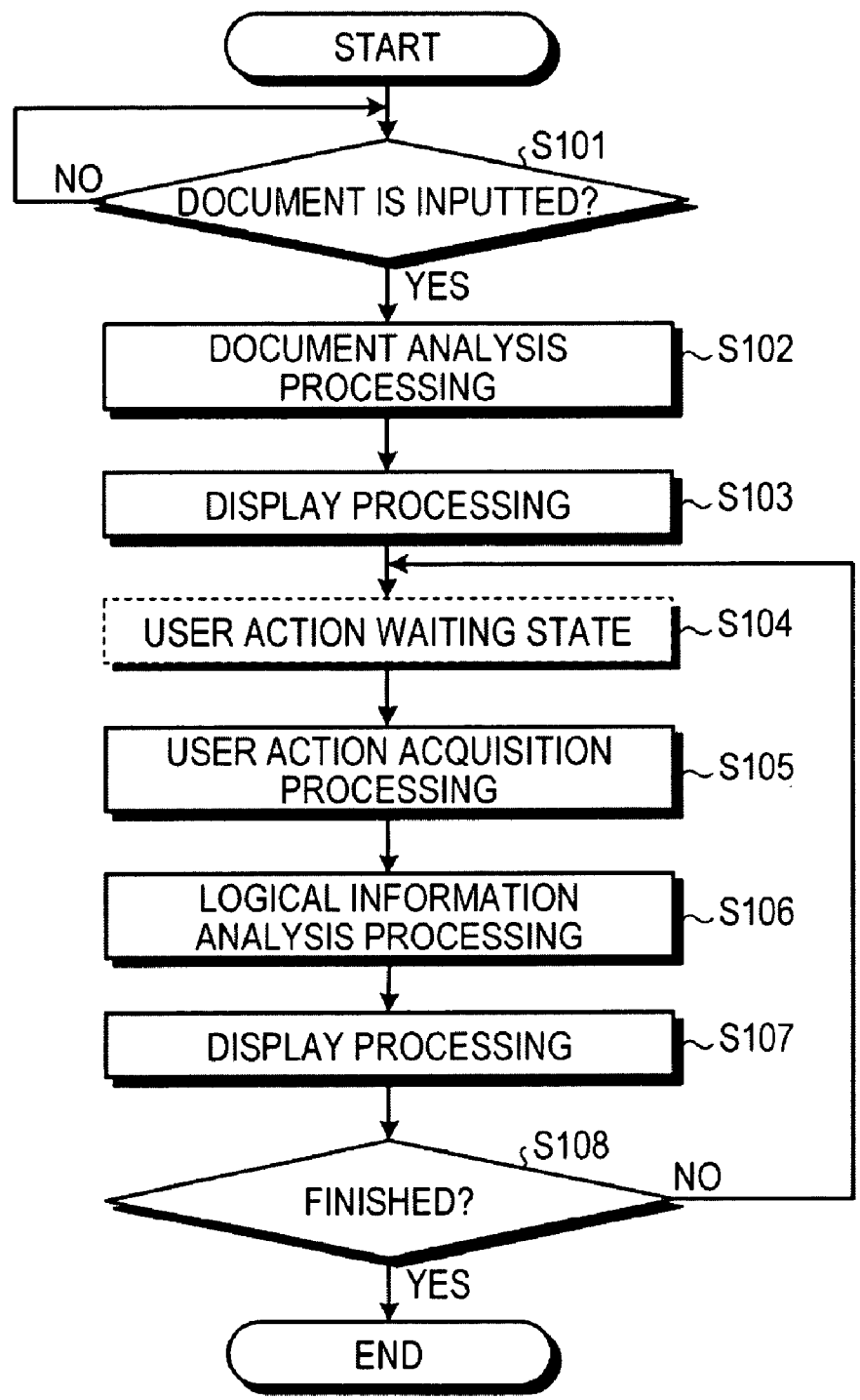
FIG. 14 is a flowchart showing a flow of overall processing in the document recognizing apparatus according to an example embodiment of the present invention.

Processing by the document recognizing apparatus is explained with reference to FIGS. 14 to 18. FIG. 14 is a flowchart showing a flow of overall processing in the document recognizing apparatus according to an example embodiment, such as the first example embodiment.

As shown in FIG. 14, when a document is inputted (Yes at S101), the document recognizing apparatus 10 carries out document analysis processing (at S102). Specifically, when a document is received by the input receiving unit 11, the layout recognizing unit 32 and the character recognizing unit 33 of the document recognizing apparatus 10 recognizes a layout of the inputted document and character strings on the document on the basis of the layout information stored in the layout information DB 21. The logical-structure recognizing unit 34 of the document recognizing apparatus 10 recognizes the logical structure of the character strings on the received document and stores the logical structure in the document data DB 23.

Subsequently, the document recognizing apparatus 10 performs display processing for the inputted document and transitions to a user action waiting state (at S103 and S104). Specifically, the logical-structure analyzing unit 35 of the document recognizing apparatus 10 outputs, on the basis of the character strings on the document received by the input receiving unit 11 and stored in the document data DB 23 and a relation among logical elements associated with the character strings, a display control instruction for displaying a document recognition result as a correction window to the interface control unit 31. The interface control unit 31 displays the inputted document on the display unit 12 on the basis of the received display control instruction and transitions to a state for receiving a user action.

Thereafter, the document recognizing apparatus 10 that receives the user action performs user action acquisition processing, performs logical information analysis, and displays a result of the analysis (at S105 to S107). Specifically, when a certain area (character string) of the correction window (read document data) displayed on the display unit 12 is corrected by user operation, the interface control unit 31 outputs content of the correction to the logical-structure analyzing unit 35. The logical-structure analyzing unit 35 corrects the logical structure of the document in the document data DB 23 on the basis of the received correction content, the character strings on the document stored in the document data DB 23, and the relation among the logical elements (the logical structure of the document). The logical-structure analyzing unit 35 outputs the corrected logical structure of the document to the interface control unit 31. The interface control unit 31 displays the received and corrected logical structure of the document on the display unit 12.

The document recognizing apparatus 10 repeats the processing in at S104 to S107 until processing end is selected by a user action (No at S108). When the processing end is selected by the user action (Yes at S108), the document recognizing apparatus 10 finishes the processing.

Figure 15:
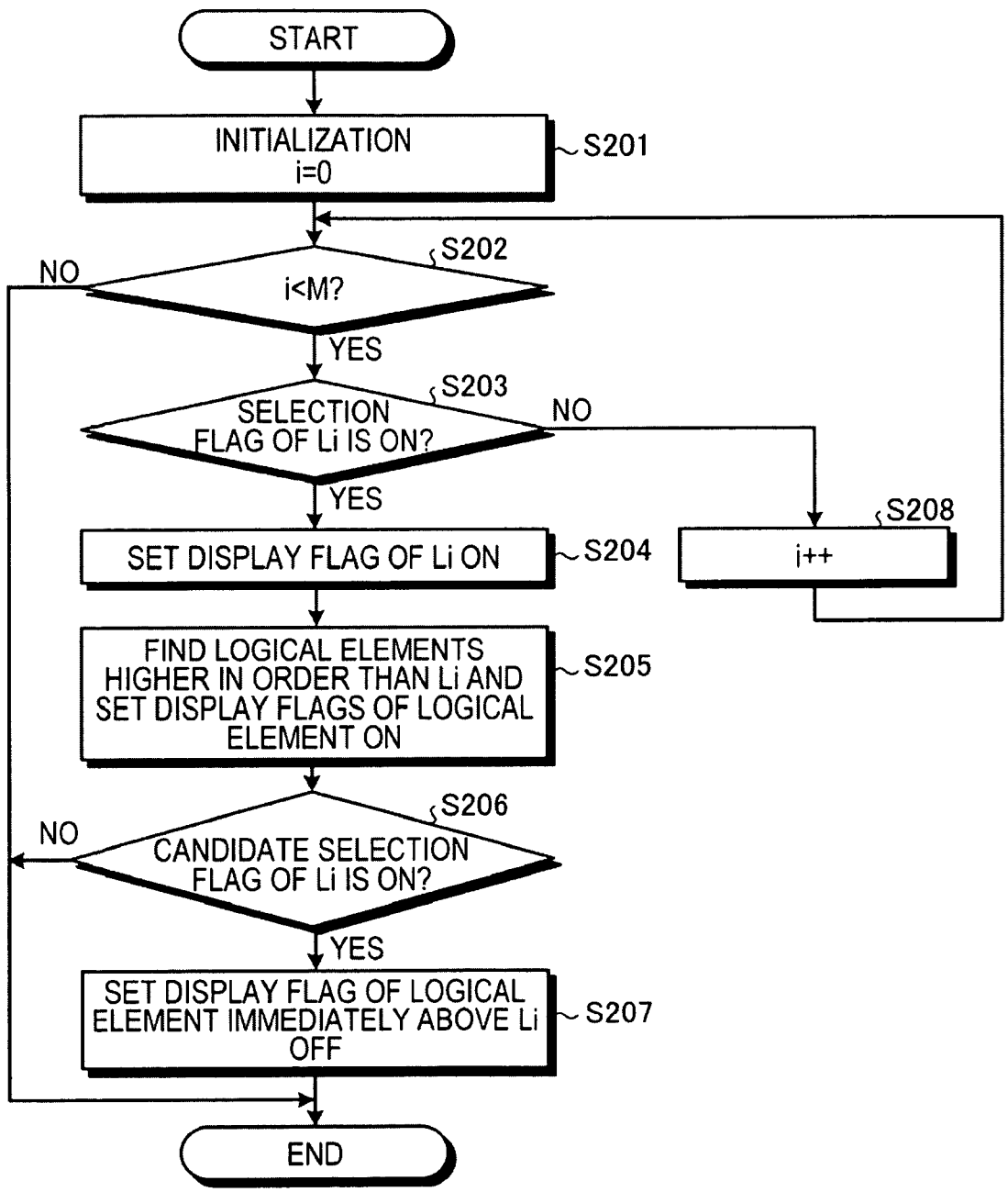
FIG. 15 is a flowchart showing a flow of display item determination processing in the document recognizing apparatus according to an example embodiment of the present invention.

Display item determination processing is explained with reference to FIG. 15. FIG. 15 is a flowchart showing a flow of the display item determination processing in the document recognizing apparatus according to an example embodiment, such as the first example embodiment.

The display item determination processing corresponds to S107 in FIG. 14. The display item determination processing is processing for determining, when a user action is received after the logical structure of the inputted document is displayed on the display unit 12, display items on the basis of the user action.

Specifically, in the document recognizing apparatus 10, in the display item determination processing, when the user selects a certain item, a logical element with a selection flag of the item set ON is sent from the interface control unit 31 to the logical-structure analyzing unit 35. Therefore, the logical-structure analyzing unit 35 searches through the logical elements stored in the document data DB 23 and finds a logical element with a selection flag set ON. The logical-structure analyzing unit 35 lists, referring to the logical structure model DB 21 using a logical element ID of the logical element, all high-order logical elements tracing the corresponding logical element and high-order logical elements in such a manner as a parent of the logical element and a parent of the parent logical element. The logical-structure analyzing unit 35 searches through the document data DB 23 and finds logical elements corresponding to the listed logical element and sets display flags of the logical elements ON. When a candidate change flag of a logical element, the selection flag of which is ON, is NOW, the logical-structure analyzing unit 35 sets a display flag of a logical element right above the logical element OFF.

Variables "i (i=0 to M)" are allocated to all the extracted and associated logical elements (logical elements Li) on the basis of the logical structure model DB 22. A flow of the processing described above is explained with reference to a flowchart. A certain item is selected by the user and the logical-structure analyzing unit 35 receives a logical structure in which a selection flag of the item is set ON from the interface control unit 31. The logical-structure analyzing unit 35 substitutes "0" in the variable "i" (at S201).

When the variable "i" is smaller than "M" (Yes at S202), the logical-structure analyzing unit 35 determines whether a selection flag of a logical element "Li" stored in the document data DB 23 is ON (at S203).

When the selection flag of the logical element "Li" stored in the control information 22d of the document data DB 23 is ON (Yes at S203), the logical-structure analyzing unit 35 sets a display flag of the logical element "Li" ON (at S204). The logical-structure analyzing unit 35 finds logical elements higher in order than the logical element "Li" referring to the data structure of the logical elements stored in the logical structure model DB 22 and sets display flags of the logical elements ON (at S205). The logical-structure analyzing unit 35 determines whether a candidate selection flag of the logical element "Li" is ON (at S206).

Thereafter, when the candidate selection flag of the logical element "Li" stored in the control information 22d of the document data DB 23 is ON (Yes at S206), the logical-structure analyzing unit 35 sets a display flag of a logical element immediately above the logical element "Li" OFF and finishes the processing (at S207). When the candidate selection flag of the logical element "Li" is not ON (No at S206), the logical-structure analyzing unit 35 directly finishes the processing.

On the other hand, when the selection flag of the logical element "Li" stored in the control information 22d of the document data DB 23 is not ON (No at S203), the logical-information analyzing unit 35 applies the processing at S202 to S207 to the next logical element "Li+1" with the variable "i" increased by "1" (at S208).

Figure 16:
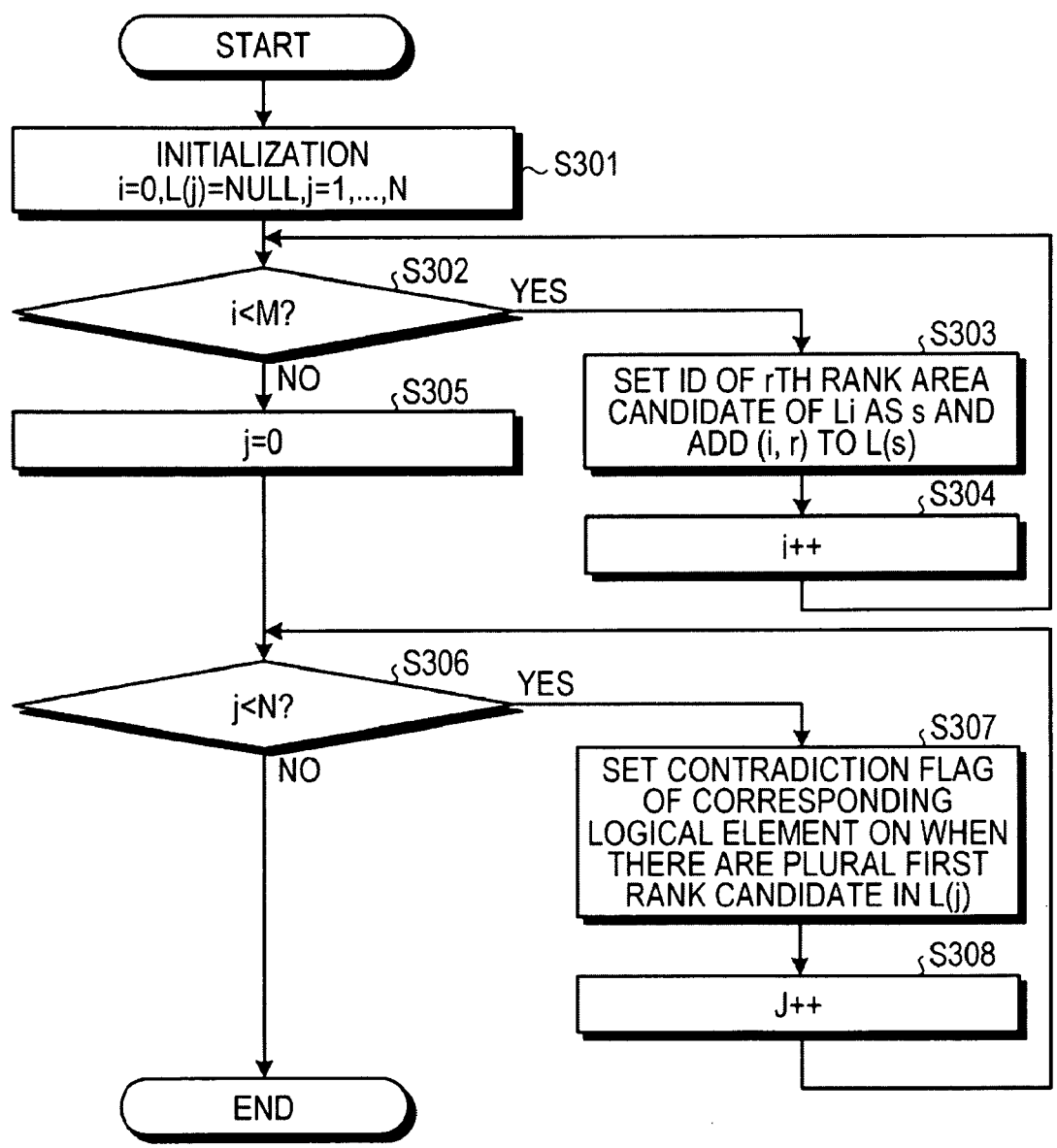
FIG. 16 is a flowchart showing a flow of contradictory item finding processing in the document recognizing apparatus according to an example embodiment of the present invention.
Figure 17:
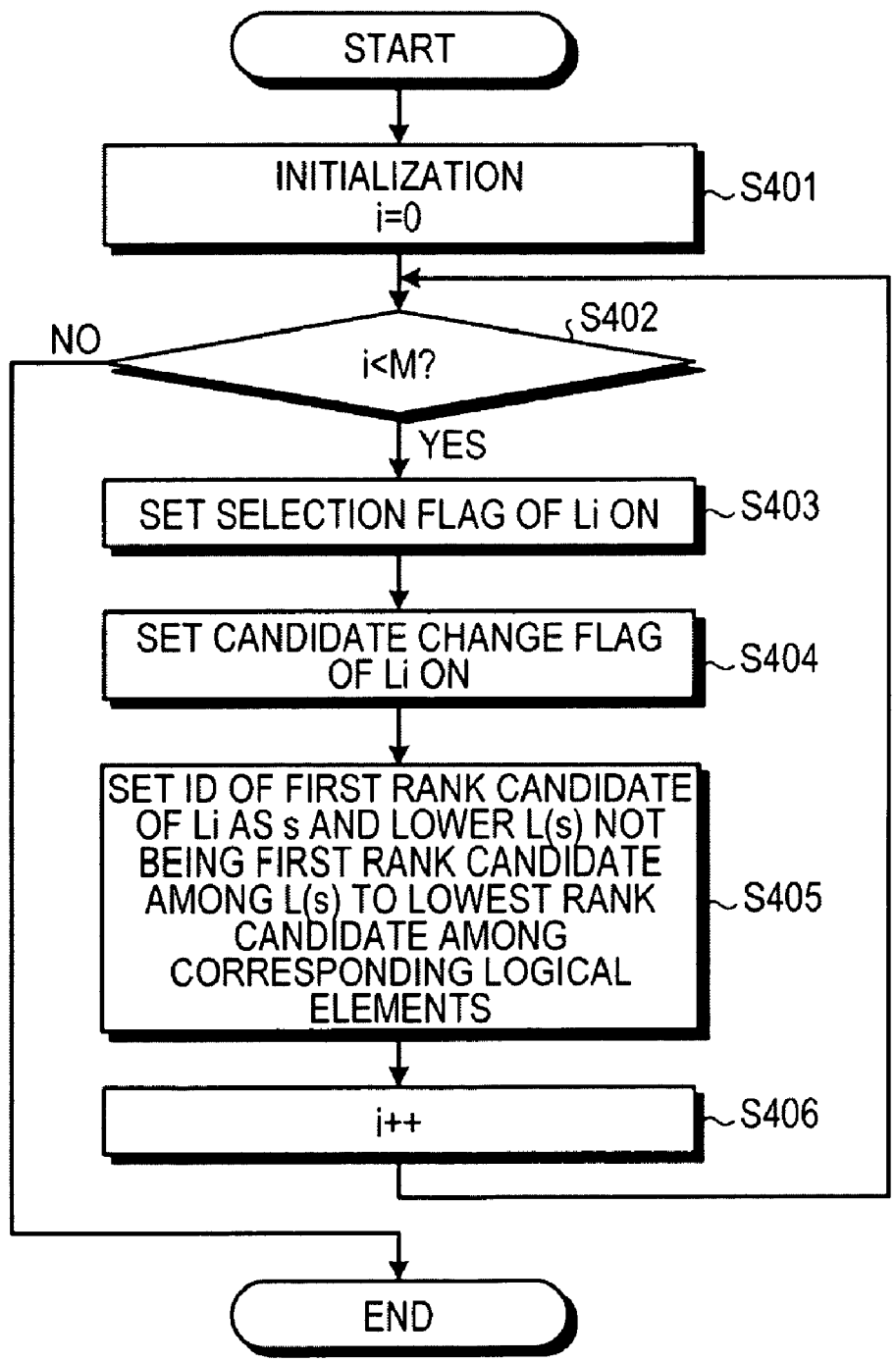
FIG. 17 is a flowchart showing a flow of candidate flag changing processing in the contradictory item finding processing according to an example embodiment of the present invention.

Contradictory item finding processing is explained with reference to FIGS. 16 and 17. FIG. 16 is a flowchart showing a flow of the contradictory item finding processing in the document recognizing apparatus according to an example embodiment, such as the first example embodiment. FIG. 17 is a flowchart showing a flow of candidate flag changing processing in the contradictory item finding processing according to an example embodiment, such as the first example embodiment.

The contradictory item finding processing corresponds to S106 and S107 in FIG. 14. The contradictory item finding processing is processing for finding, when a user action such as correction is received, a contradictory item generated in content of correction according to the user action.

Specifically, in the contradictory item finding processing, the document recognizing apparatus 10 searches through a logical structure, finds logical elements, areas of which corresponding to an area ID are area candidates, and lists logical element IDs and candidate ranks of the logical element IDs. When there are plural first rank candidates for one area ID, the document recognizing apparatus 10 sets contradiction flags of information on logical elements corresponding thereto and a parent thereof ON. When candidate change flags of logical elements, selection flags of which are ON, are NOW, concerning a logical element, a first rank candidate of which is an area candidate, the document recognizing apparatus 10 lowers the rank of the logical element to a lowest rank candidate when the logical element is not the first rank candidate. The document recognizing apparatus 10 increases the rank of the other logical elements and sets candidate change flags thereof to PAST.

Variables "i (i=0 to M)" (logical element Li) and "j" (logical element Lj) are allocated to all the extracted and associated logical elements on the basis of the logical structure model DB 21. A flow of the processing is explained with reference to a flowchart. A certain item is selected by the user and the logical-information analyzing unit 35 receives logical information in which the selection flag stored in the control information 22d of the document data DB 23 is set ON from the interface control unit 31. The logical-information analyzing unit 35 applies initialization of variables for setting the variables "i" to "0", "Lj=NULL", and "j=1 to N" (at S301).

When the variable "i" is smaller than "M" (Yes at S302), the logical-information analyzing unit 35 sets an ID of an rth rank area candidate of the logical element "Li" stored in the control information 22d of the document data DB 23 as "s" and adds (i, r) to L(s) (at S303), increases the variable "i" by "1" (at S304), and returns to S302. In other words, when there are plural candidates for one logical element "Li", the logical-information analyzing unit 35 associates the candidates to be candidates "L(i, r)" of one logical element.

Thereafter, when the variable "i" increases to be larger than "M" (No at S302), the logical-structure analyzing unit 35 substitutes "0" in a side "j" (at S305) and determines whether the variable "j" is smaller than "N" (at S306).

When the variable "j" is smaller than "N" (Yes at S306), the logical-structure analyzing unit 35 sets, referring to the control information 22d of the document data DB 23, when there are plural first rank candidates in "Lj", contradiction flags of logical elements corresponding to the first rank candidates ON (at S307), increases the variable "j" by "1" (at S308), and repeats the processing at S306 and subsequent thereto. When the variable "j" increases to be larger than "N" (No at S306), the logical-structure analyzing unit 35 finishes the processing.

Referring to the control information 22d of the document data DB 23, when the logical element "Li" changed by the user is used as the logical element "Lj" of another area, since contradiction occurs, the logical-structure analyzing unit 35 determines whether there is another logical element "Li" that coincides with the logical element "Li" changed by the user. When there is the logical element "Lj", the logical-structure analyzing unit 35 sets a contradiction flag of the logical element "Lj" ON.

A flow of candidate flag changing processing in the contradictory item finding processing according to an example embodiment, such as the first example embodiment, is explained with reference to FIG. 17. As shown in FIG. 17, a certain item is selected by the user and the logical-structure analyzing unit 35 receives logical information in which a selection flag stored in the control information 22d of the document data DB 23 is ON from the interface control unit 31. The logical-information analyzing unit 35 substitutes "0" in the variable "i" (at S401).

When the variable "i" is smaller than "M" ("Yes" at S402), the logical-structure analyzing unit 35 sets the selection flag of the logical element "Li" stored in the control information 22d of the document data DB 23 ON, sets the candidate change flag of the logical element "Li" ON, and sets the ID of the first rank candidate of the logical element "Li" as "s", and lowers a logical element not being the first rank candidate among the logical elements L(s) to a lowest rank candidate that is lowest in a rank among the corresponding logical elements (at S403 to S405). Thereafter, the logical-structure analyzing unit 35 increases the variable "i" by "1" (at S406) and applies the processing at S402 to S405 to the next logical element "Li+1". When the variable "i" increases to be larger than "M" (No at S402), the logical-structure analyzing unit 35 finishes the processing.

Figure 18:
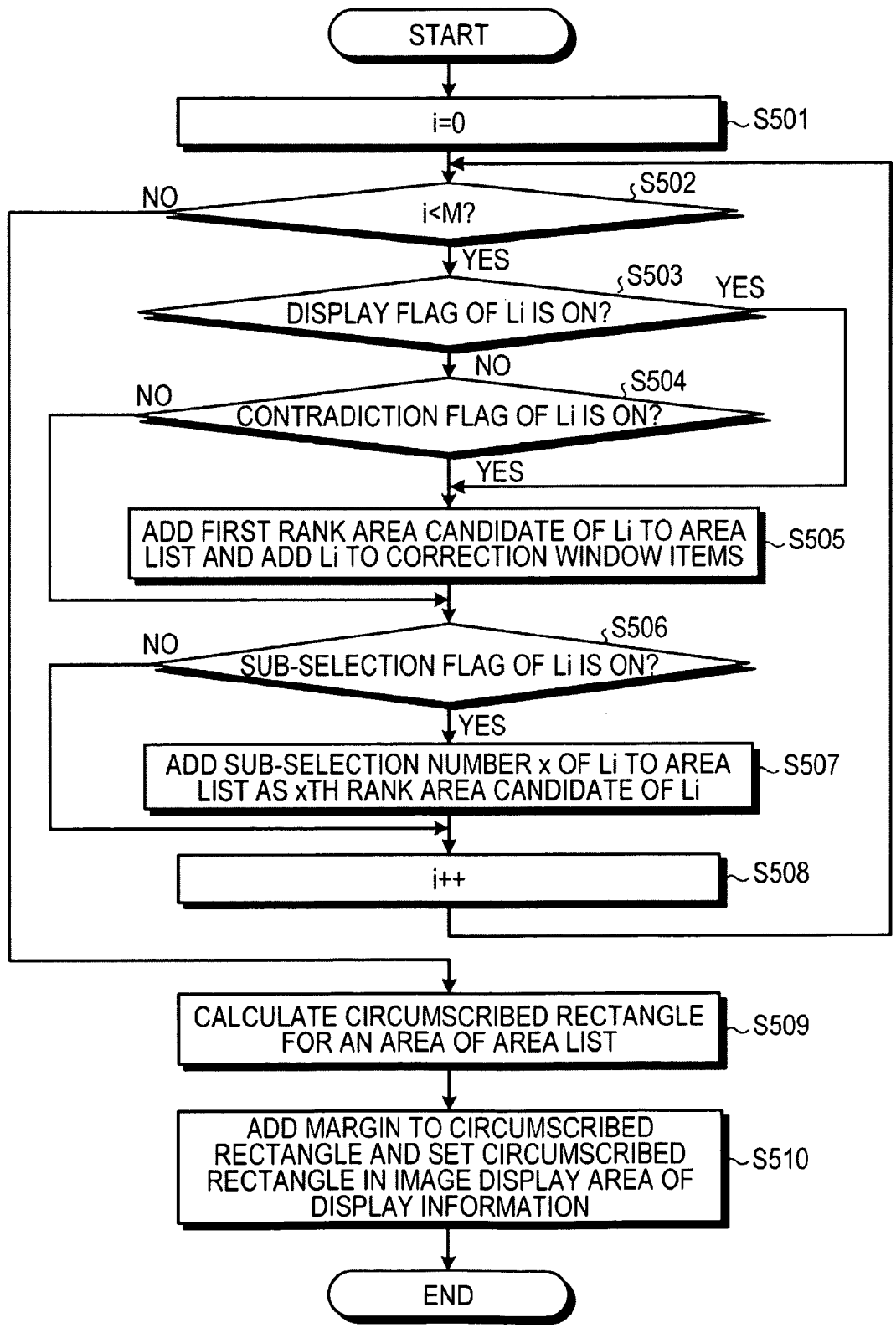
FIG. 18 is a flowchart showing a flow of display information setting processing in the document recognizing apparatus according to an example embodiment of the present invention.

Display information setting processing is explained with reference to FIG. 18. FIG. 18 is a flowchart showing a flow of the display information setting processing in the document recognizing apparatus according to an example embodiment, such as the first example embodiment. The display information setting processing corresponds to S107 in FIG. 14. The display information setting processing is processing for determining, after the contradictory item finding processing, a display item and determining an area of an image to be displayed.

Specifically, in the display information setting processing, the document recognizing apparatus 10 finds, concerning logical elements, display flags of which are ON, a highest-order logical element without a root and sets the logical element as a highest-order logical element of display information. In the display information setting processing, the document recognizing apparatus 10 writes logical elements, display flags of which are ON, and logical elements, contradiction flags of which are ON, in correction window display items. Concerning these areas in a first rank of area candidates and areas in an xth rank of area candidates in logical elements, sub-selection flags of which are ON (a sub-selection number is x), the document recognizing apparatus 10 finds a circumscribed rectangle surrounding the areas on a document image. The document recognizing apparatus 10 adds a margin of a size determined in advance around the circumscribed rectangle, if the circumscribed rectangle extends beyond the image, corrects the circumscribed rectangle not to extend beyond the image, determines a display area on the document image, and sets coordinates of the display area in an image display area.

Variables "i (i=0 to M)" are allocated to all extracted and associated logical elements (logical elements Li) on the basis of the logical structure model DB 22. A flow of the processing described above is explained with reference to a flowchart. When a certain item is selected by the user and the logical-structure analyzing unit 35 receives logical information in which a selection flag of the item is ON from the interface control unit 31. The logical-structure analyzing unit 35 substitutes "0" in the variable "i" (at S501).

When the variable "i" is smaller than "M" (Yes at S502), the logical-structure analyzing unit 35 determines whether a display flag of a logical elements "Li" stored in the control information 22d of the document data DB 23 is ON (at S503).

When the display flag of the logical element "Li" stored in the control information 22d of the document data DB 23 is not ON (No at S503), the logical-structure analyzing unit 35 determines whether a contradiction flag of the logical element "Li" stored in the control information 22d of the document data DB 23 is ON (at S504). When the contradiction flag is ON (Yes at S504), the logical-structure analyzing unit 35 adds a first rank area candidate of the logical element "Li" in the area list and adds an area candidate "Li" to the correction window items (at S505).

When a sub-selection flag of the logical element "Li" stored in the control information 22d of the document data DB 23 is ON (Yes at S506), the logical-structure analyzing unit 35 adds a sub-selection number x of the logical element "Li" to the area list as an xth rank area candidate of the logical element "Li" (at S507). Thereafter, the logical-structure analyzing unit 35 increases the variable "i" by "1" (at S508) and repeats the processing at S502 to S508.

On the other hand, when the sub-selection flag of the logical element "Li" stored in the control information 22d of the document data DB 23 is not ON (No at S506), thereafter, the logical-structure analyzing unit 35 increases the variable "i" by "1" (at S508) and repeats the processing S502 to S508.

Returning to S503, when the display flag of the logical element "Li" stored in the control information 22d of the document data DB 23 is ON (Yes at S503), the logical-information analyzing unit 35 performs the processing at S505. When the contradiction flag of the logical element "Li"

stored in the control information 22*d* of the document data DB 23 is not ON (No at S504), the logical-information analyzing unit 35 carries out the processing at S506.

Thereafter, when the variable "i" increases to be larger than "M" (No at S502), the logical-structure analyzing unit 35 calculates a circumscribed rectangle for an area in the area list using coordinates, adds a margin determined in advance to the calculated circumscribed rectangle to set an image display area for display information, and stores the image display area in the display information 22*e* of the document data DB 23 (S509 and S510).

Figure 22:
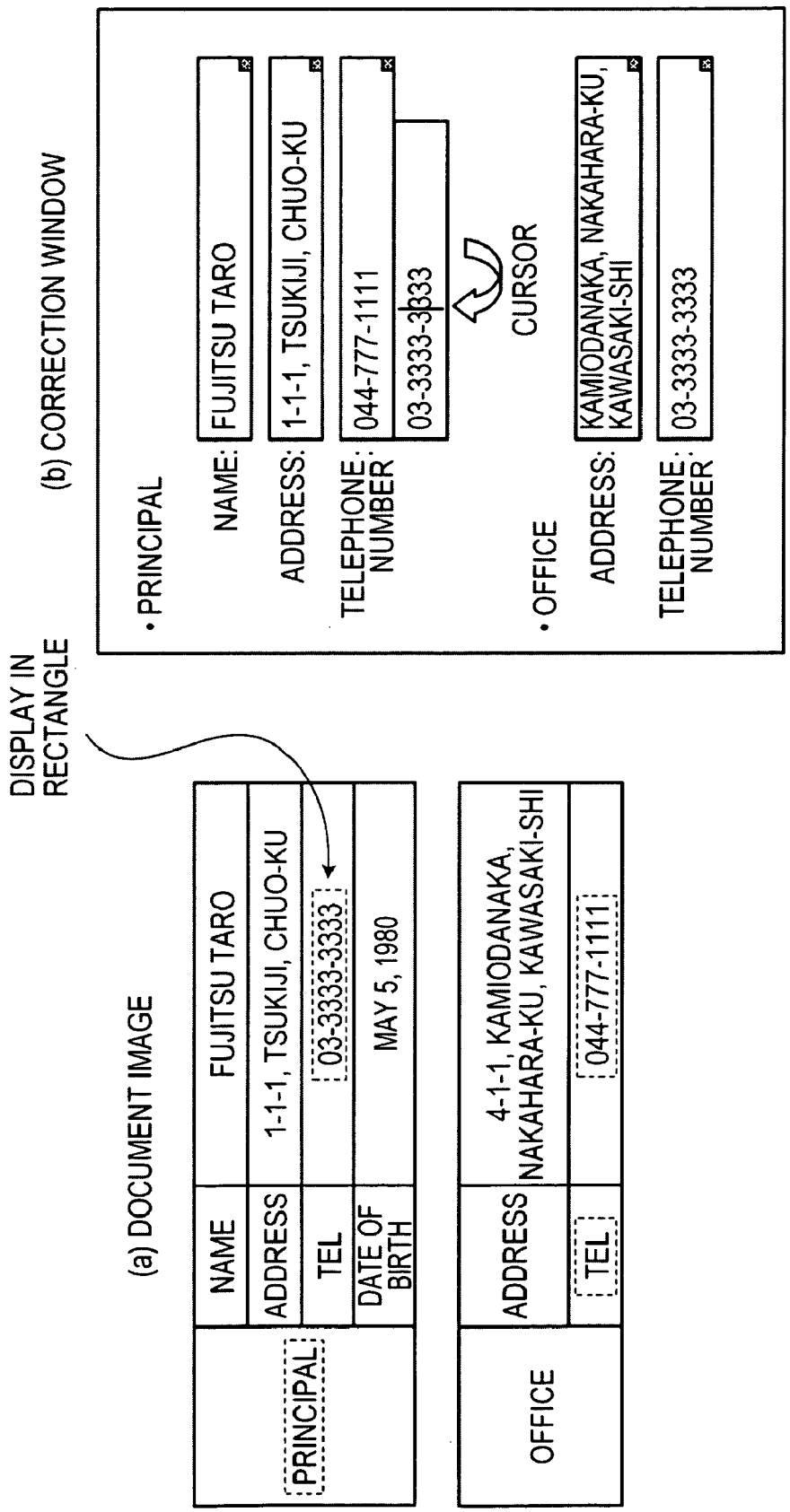
FIG. 22 is a diagram showing an example in which a logical element is corrected by the user according to an example embodiment of the present invention.
Figure 24:
FIG. 24 is a diagram showing an example in which the contradictory item is corrected according to an example embodiment of the present invention.

Processing by the document recognizing apparatus is explained by using an example of screen display with reference to FIGS. 19 to 25. FIG. 19 is a diagram showing an example of a screen to be displayed. FIG. 20 is a diagram showing a screen selected by the user. FIG. 21 is a diagram showing a screen on which logical element candidates are illustrated. FIG. 22 is a diagram showing an example in which a logical element is corrected by the user. FIG. 23 is a diagram showing an example in which a contradictory item is found. FIG. 24 is a diagram showing an example in which the contradictory item is corrected. FIG. 25 is a diagram showing an example in which the correction is completed.

In a correction screen for logical information, an image to be recognized and a correction window are arranged side by side (see FIG. 19). Logical information is displayed in the correction window. The user can freely write data sections of the logical information. Buttons are provided on the lower right of data input sections. When the data input sections are selected, the buttons become active. When the user presses the buttons, candidates are displayed. When the user selects a logical element, the document recognizing apparatus 10 clearly displays, referring to the control information 22*d* and the like, higher-order logical elements related to the selected logical element and areas on a document corresponding to the logical elements. This makes it possible to distinguish headings that have the same word but have different meanings. This makes correction sure and efficient.

As a specific example, when the document recognizing apparatus carries out the processing at S101 to S103 shown in FIG. 14, as shown in FIG. 19, the document recognizing apparatus 10 displays, on the display unit 12, a document image (a) as data of a read original document and a correction window (b) created by acquiring a logical structure from the read document. The document recognizing apparatus 10 includes the data shown in FIGS. 8 to 10 in association with respective logical elements (e.g., a principal and a telephone number) displayed here.

In this example, the user misrecognizes a telephone number of a principal and a telephone number of an office. When a telephone number space of the principal on the correction screen is clicked and selected by the user, the document recognizing apparatus 10 highlights a heading corresponding thereto, e.g., a high-order heading, at substantially the same time, displays a character string corresponding thereto in a rectangle in the document image on the left, and displays a telephone number (044-777-1111) in a size of the character strings in the center. The user looks at the display and instantly notices that the correspondence of the character string is wrong (see FIG. 20).

The document recognizing apparatus 10 does not change the display of the document image unless a highest-order logical element of the heading without any root changes. Therefore, the document image on the left does not move every time of check and moves when the highest-order logical element of the heading changes. Consequently, the user can smoothly move an eye point in checking the logical elements.

For example, assuming that all logical structure recognition results are correct as shown in FIG. 7, the document recognizing apparatus 10 checks the logical elements in order from the top of the correction window. When a principal name, a principal address, and a principal telephone number are checked, a table of the principal in the document image is closed up and displayed and the screen does not move. The screen is moved to close up a table of the office when an office address is checked.

Thereafter, when the user corrects a logical item, the document recognizing apparatus 10 presents, on the basis of a result of the correction, a contradictory item or an item that should be checked to the user. If the logical element corrected by the user is a related section and is wrong, the document recognizing apparatus 10 presents that the correction is highly likely wrong.

For example, since the user notices that the telephone number of the principal is wrong, when a gray button on the lower right is clicked by the user, the document recognizing apparatus 10 displays another character string candidate (see FIG. 21). When the user places a cursor on a second candidate, the document recognizing apparatus 10 displays a character string corresponding to the character string candidate in a rectangle on the document screen (see FIG. 22). Thereafter, the user checks and selects the character string. Then, since the telephone numbers of the office overlap, the document recognizing apparatus 10 displays a contradictory section on the correction screen and urges the user to check the section (see FIG. 23). Similarly, when the gray button on the lower right is clicked, the document recognizing apparatus 10 displays another character string candidate (see FIG. 24). The user places the cursor on the second candidate and selects the second candidate (see FIG. 25).

Figure 26:
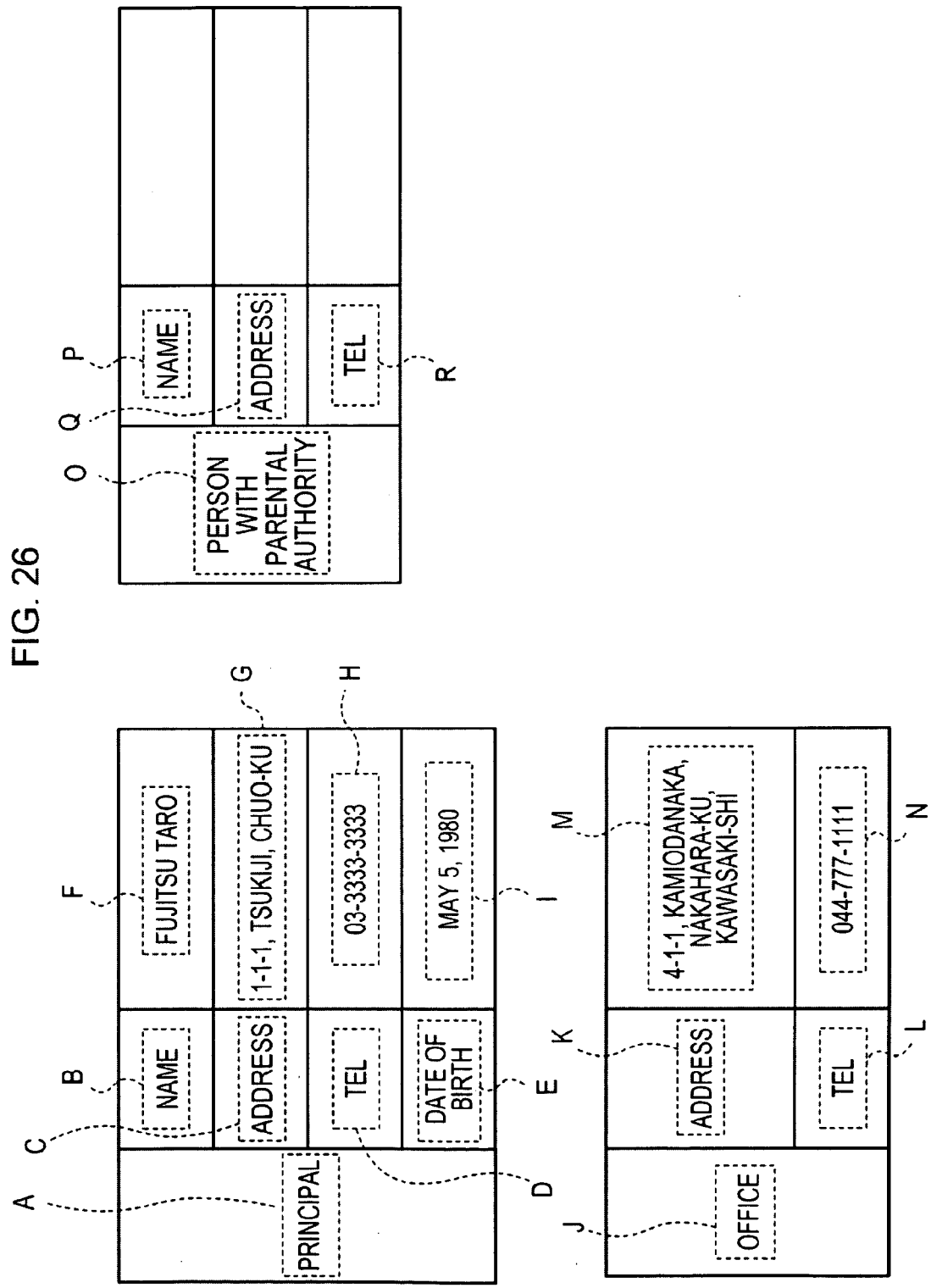
FIG. 26 is a diagram showing an example of a screen in which a space of a person with parental authority is added to a principal and an office according to an example embodiment of the present invention.
Figure 27:
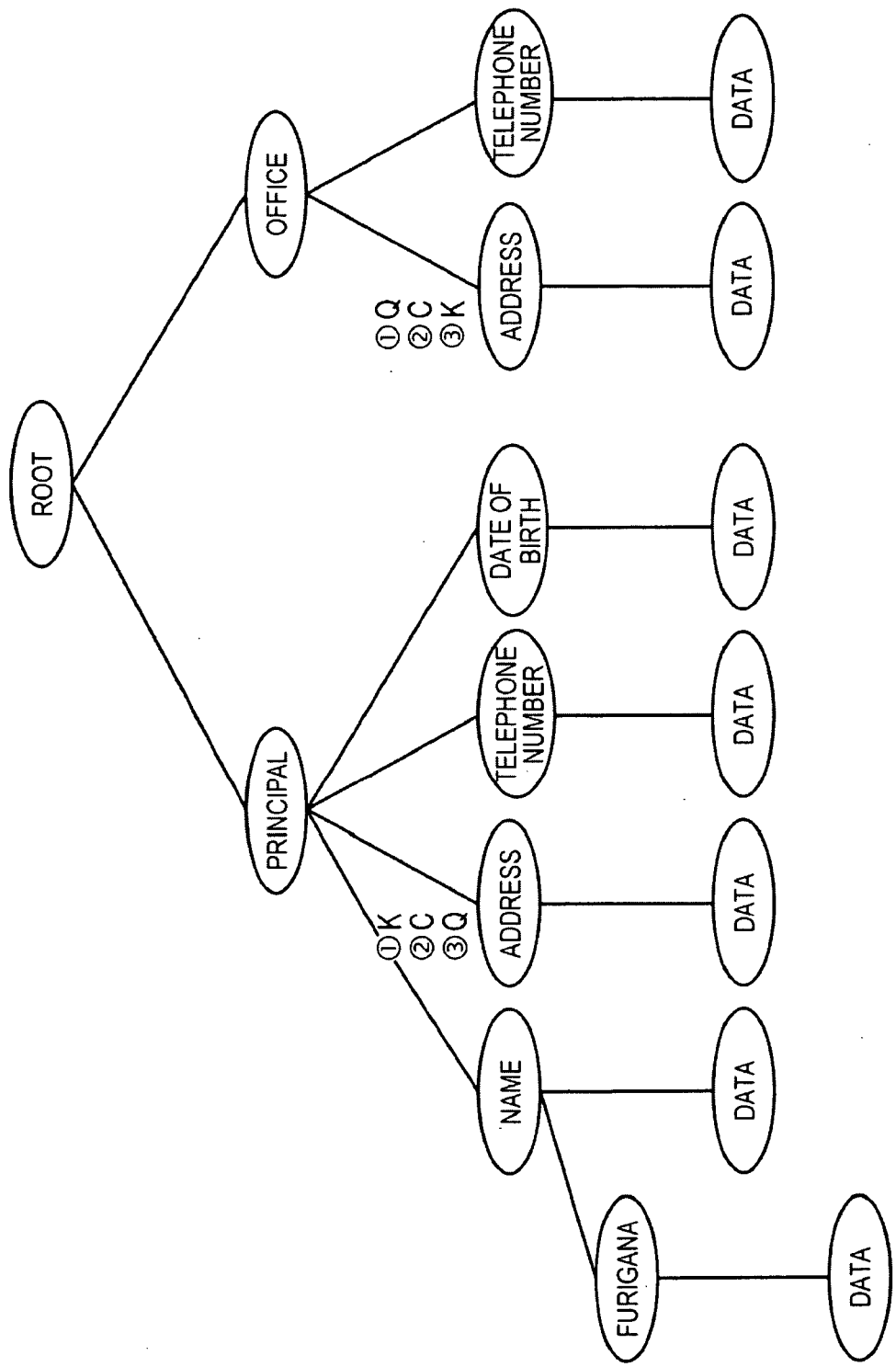
FIG. 27 is a diagram showing a part of a logical structure recognition result according to an example embodiment of the present invention.

Thereafter, every time the user performs correction, the document recognizing apparatus 10 compares a correction result and a recognition result candidate and updates the rank of the recognition result candidate (see FIGS. 26 and 27). FIG. 26 is a diagram showing an example of a screen in which a space of a person with parental authority is added to the principal and the office. FIG. 27 is a diagram showing a part of a logical structure recognition result. It is assumed that recognition candidates of the principal address are "1. K", "2. C", and "3. Q" and recognition candidates of the office are "1. Q", "2. C", and "3. K". When the principal address is corrected to C, the document recognizing apparatus 10 can determine that it is almost unlikely that the recognition candidate of the office is C. Therefore, the document recognizing apparatus 10 changes the recognition candidate of the office to "1. Q", "2. K", and "3. C".

Concerning the flow of the processing described above, in such a display screen, the character strings of the headings and the data input sections can be selected by click and the character strings in the data sections can be changed in the correction window according to operation by the user. The user had, for the change of the data sections, two mechanism: a mechanism for selecting a recognition candidate and a mechanism for directly writing a character string.

Specifically, when the user clicks any one of the character strings of the headings and the data input sections in the correction window, the document recognizing apparatus 10 finds which place is clicked and sets a selection flag of logical information corresponding thereto ON. When the document recognizing apparatus 10 displays a second rank and lower rank recognition candidates of data character strings and the user places the cursor (a mouse) thereon in the correction window, the document recognizing apparatus 10 sets a sub-selection flag ON and sets a candidate rank of the candidate on which the cursor is placed as a sub-selection number. The document recognizing apparatus 10 performs the same processing every time a candidate on which the cursor is placed changes. When a candidate is selected by the user, the document recognizing apparatus 10 updates the rank of a recognition candidate to set the selected candidate in the first rank in logical information corresponding to the candidate and sets the candidate change flag as NOW. When a character string is directly written, the document recognizing apparatus 10 replaces a character string of a first rank candidate of the logical information with the character string, clears the character information to reduce the number of characters to 0, and clears the area ID and the coordinates.

As shown in FIG. 19, in the screen displayed by the document recognizing apparatus 10, there are a window in which a document image is displayed and a window in which a correction image is displayed. In the display of the document image, the document recognizing apparatus 10 displays an area of the document image corresponding to an image display area of display information. In the correction window, the document recognizing apparatus 10 displays data, which is desired to be inputted from a document, together with a hading thereof and a high-order heading. It is possible to set in advance which data of the logical structure model DB 22 are inputted and in which order the data are displayed. In an initial state, the document recognizing apparatus 10 displays all of the data. However, when correction work by the user begins, the document recognizing apparatus 10 partially displays the data such that logical elements written in correction window display items of the display information are included in the data.

Specifically, the logical-structure analyzing unit 35 receives logical information and display information from the interface control unit 31. The logical-structure analyzing unit 35 compares, referring to a highest-order logical element of the display information 22e and an image display area, an immediately preceding highest-order logical element and image display area. If the highest-order logical element is the same as the immediately preceding one and the image display area is included in the immediately preceding one, the logical-structure analyzing unit 35 does not change a display area from an immediately preceding one. Otherwise, the logical-information analyzing unit 35 determines a given image display area as a display area and stores the display area in the display information 22e.

The logical-structure analyzing unit 35 displays the image display area on the document image such that logical elements written in correction window display items on the correction window are included therein. Moreover, the logical-structure analyzing unit 35 displays an area in a first rank of area candidates concerning a logical element, a display flag of which are ON in the control information 22d, in a rectangle. On the correction window, if the logical element is a heading, the logical-structure analyzing unit 35 displays the logical element with a color of a character string changed (e.g., blue). If the logical element is data, the logical-structure analyzing unit 35 displays the logical element with a color of an input section changed (e.g., red). Similarly, the logical-structure analyzing unit 35 sets a sub-selection number as x concerning a logical element, a selection flag of which is ON and a sub-selection flag of which is ON in the control information 22d. The logical-structure analyzing unit 35 displays an area in an xth rank of area candidates in a rectangle with a color changed (e.g., orange). The logical-structure analyzing unit 35 displays a logical element, a display flag of which is OFF and a contradiction flag of which is ON in the control information 22d, with a color of a character string of the logical element changed (e.g., green). When a type of the logical element is data, the logical-structure analyzing unit 35 displays an area in the first rank of the area candidates in a rectangle with a color changed (e.g., green).

In this way, according to an example embodiment, the document recognizing apparatus stores, as document data, character strings on a document and association of the character strings on the document and a relation among logical elements stored in the logical structure model DB 22 in the document data DB 23, recognizes an inputted document, and extracts character strings coinciding with the logical elements stored in the logical structure model DB 22 and stores the character strings in the document data DB 23. The document recognizing apparatus extracts a combination of character strings on the document satisfying the relation among the logical elements stored in the logical structure model DB 22, stores association of the character strings on the document and the relation among the logical elements stored in the logical structure model DB 22 in the document data DB 23, and outputs the document data stored in the document data DB 23 and the recognized document image to the display unit 12. When a character string of the document data displayed on the display unit 12 is selected by the user, the document recognizing apparatus specifies a character string related to the selected character string from the document data DB 23 and displays document data in which the specified character string is distinguished from the other character strings on the display unit 12. Further, the document recognizing apparatus displays an image that at least includes the specified character string of the document data of the document image on the display unit 12. Therefore, it is possible to reduce a burden on a correction operator in correction work for recognized document data.

According to an example embodiment, such as the first example embodiment, the document recognizing apparatus recognizes an inputted document, extracts character strings on the document to be candidates of logical elements stored in the logical structure model DB 22, and stores the character strings in the document data DB 23. The document recognizing apparatus extracts plural combinations of character strings on the document satisfying a relation among logical elements stored in the logical structure model DB 22 and stores association of the character strings on the document and the relation among the logical elements stored in the logical structure model DB 22 in the document data DB 23. When a character string of the document data displayed on the display unit 12 is selected by the user, the document recognizing apparatus further specifies other character strings to be candidates of the selected character string from the document data DB 23 and further displays the specified other character strings to be candidates on the display unit 12 in association with the character string selected by the user. Therefore, the correction operator (the user) can instantly notice that the correspondence of the character string is wrong.

According to an example embodiment, such as the first example embodiment, the document recognizing apparatus recognizes an inputted document, extracts ranks of character strings on the document to be candidates of logical elements stored in the logical structure model DB 22, and stores the ranks of the character strings in the document data DB 23 in association with the character strings. The document recognizing apparatus extracts plural combinations of character strings on the document satisfying a relation among logical elements stored in the logical structure model DB 22 and stores association of the character strings on the document and the relation among the logical elements stored in the logical structure model DB 22 in the document data DB 23.

When a character string of document data displayed on the display unit 12 is selected by the user, the document recognizing apparatus specifies other character strings to be candidates of the selected character string and the ranks of the character strings from the document data DB 23 and displays the specified other character strings with ranks to be candidates on the display unit 12 in association with the character string selected by the user. Therefore, the correction operator (the user) can instantly notice that the correspondence of the character string is wrong and can easily select new character string candidates.

According to an example embodiment, such as the first example embodiment, when a character string of document data displayed on the display unit 12 is corrected by the user, the document recognizing apparatus specifies another character string having a relation among logical elements with the corrected character string from the document data DB 23 and displays, on the display unit 12, document data in which the specified character string having the relation among the logical elements are distinguished from other character strings not specified. The document recognizing apparatus displays an image that includes at least the specified character string of the document data of a document image on the display unit 12. Therefore, it is possible to change ranks of data character string candidates every time the user corrects a recognition result and, if the ranks contradict with a correction result, draw the user's attention. As a result, the user can accurately and quickly perform correction.

Various example embodiments of the present invention has been described above. Additional example embodiments are described next (1) document image forms, (2) a system configuration and the like, and (3) programs.

(1) Document Image Forms

For example, the present invention can apply the same processing described above to, for example, a document image of a paper medium, document images of electronic files received from a network, various storage media, an electronic mail, and the like.

(2) System Configuration and the Like

The respective components of the devices shown in the figures are functionally conceptual and are not required to be physically configured as shown in the figures. In other words, specific forms of distribution and integration of the respective devices are not limited to those shown in the figures. All or a part of the devices can be functionally or physically distributed or integrated in arbitrary units according to various loads and states of use. All or a part of the respective processing functions performed in the devices can be realized by an electronic logic unit, such as central processing unit (CPU), and programs analyzed and executed by the CPU or can be realized as hardware by a hardware logic.

Among the respective kinds of processing in the various example embodiments described herein, all or a part of the kinds of processing explained as automatically performed can be manually performed. All or a part of the kinds of processing explained as manually performed can be automatically performed by a publicly-known method. Besides, the processing procedures, the control procedures, the specific names, and the information including the various data and parameters described above and shown in the figures can be arbitrarily changed unless specifically noted otherwise.

(3) Programs

The various kinds of processing in the various example embodiments described herein can be realized by executing programs prepared in advance using computer systems such as a personal computer and a workstation. Therefore, in the following description, a computer system that executes a program having functions substantially the same as those in the various example embodiments described above is also described.

Figure 28:
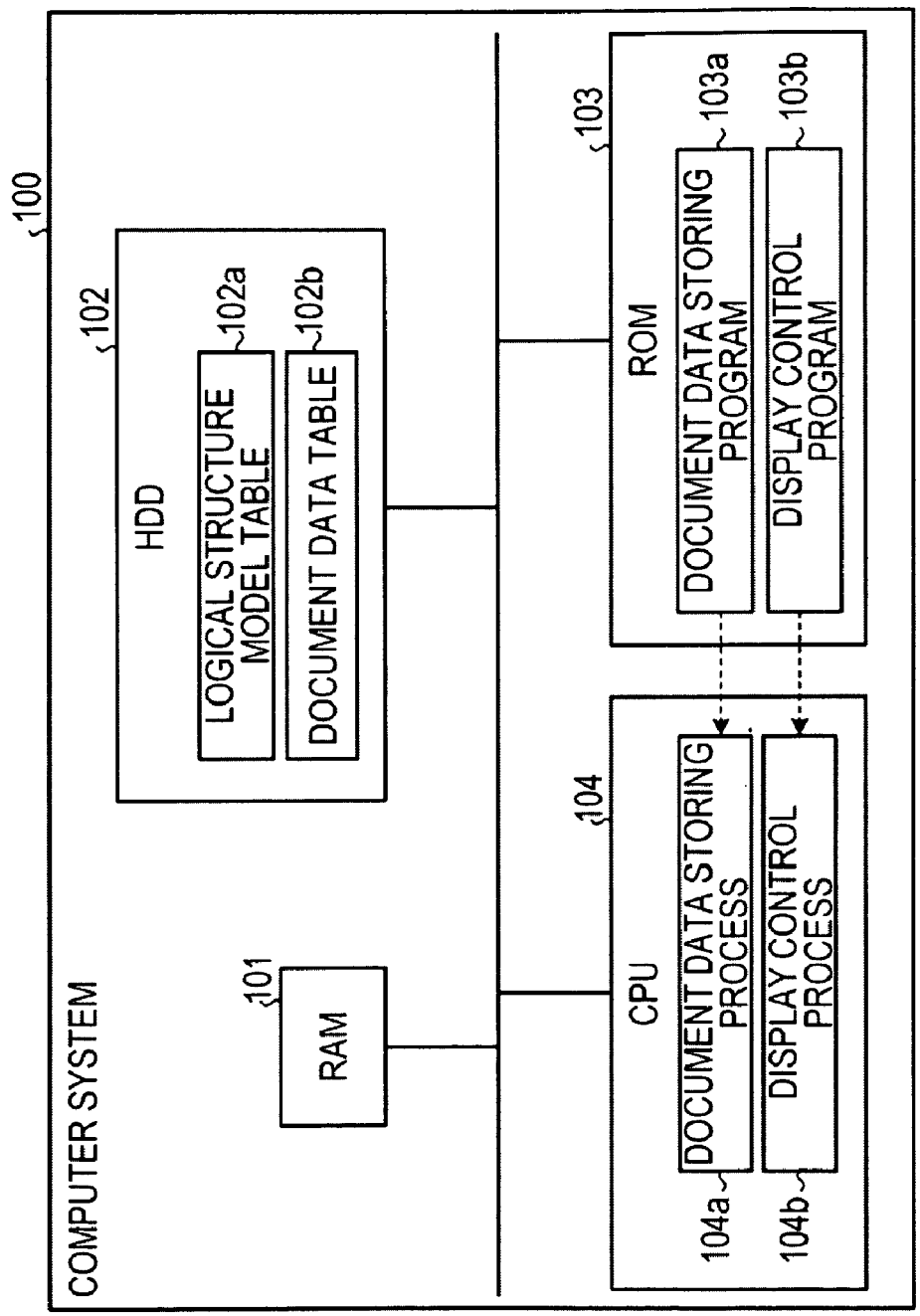
FIG. 28 is a diagram showing an example of a computer system that executes a document recognizing program according to an example embodiment of the present invention.

FIG. 28 is a diagram showing an example of a computer system that executes a document recognizing program. As shown in FIG. 28, a computer system 100 includes a RAM 101, an HDD 102, a ROM 103, and a CPU 104. Programs that provide functions substantially the same as those in the various example embodiments described above, e.g., a document data storing program 103a and a display control program 103b, are stored in advance in the ROM 103 as shown in FIG. 28. Each of the programs 103a and 103b may include programming procedures, or procedural modules, for executing one or more functions substantially the same as those in the various example embodiments described above.

The CPU 104 reads out and executes these programs 103a and 103b, whereby the programs 103a and 103b change to a document data storing process 104a and a display control process 104b as shown in FIG. 28. The document data storing process 104a corresponds to the character recognizing unit 33 and the logical-structure recognizing unit 34 shown in FIG. 2. The display control process 104b corresponds to the interface control unit 31 and the logical-structure analyzing unit 35 shown in FIG. 2.

A logical structure model table 102a that stores the logical structure indicating logical elements in various documents and a relation among the logical elements and a document data table 102b that stores, as document data, character stings on a document and association of the character strings on the document and the relation among the logical elements stored in the logical structure model table 102a are provided in the HDD 102. The logical structure model table 102a corresponds to the logical structure model DB 22 shown in FIG. 2. The document data table 102b corresponds to the document data DB 23 shown in FIG. 2.

The programs 103a and 103b do not have to be stored in the ROM 103. The programs 103a and 103b may be stored in, for example, besides computer-readable media, such as a computer-readable portable physical media such as a flexible disk (FD), a CD-ROM, an MO disk, a DVD disk, a magneto-optical disk, and an IC card inserted in the computer system 100, "fixed physical media" such as a hard disk drive (HDD) provided on the inside and the outside of the computer system 100 and "other computer systems" connected to the computer system 100 via a public line, the Internet, a LAN, a WAN, and the like. The computer system 100 may read out the programs from these media and execute the programs.

Many features and advantages of the embodiments of the invention are apparent from the detailed specification and, thus, it is intended by the appended claims to cover all such features and advantages of the embodiments that fall within the true spirit and scope thereof. Further, because numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A non-transitory computer-readable medium including a logical-structure-model storing section that stores, in association with various documents, logical structure that indicates logical elements indicating respective plural character strings forming the documents and a relation among said logical elements, said computer-readable medium further including a program stored therein, the program to be executed by an electronic logic unit, to at least: store in a memory, as document data, character strings on an input document and association of said character strings on said document and a relation among logical elements stored in said logical-structure-model storing section; extract, with respect to a document image obtained by recognizing said input document, character strings therein that coincide with said logical elements stored in said logical-structure-model storing section; store said extracted character strings in said memory; extract a combination of character strings on said input document satisfying said relation among said logical elements stored in said logical-structure-model storing section; and store association of said character strings on said input document and said relation among said logical elements stored in said logical-structure-model storing section in said memory.

2. The non-transitory computer-readable medium of claim 1, with the program stored thereon to be executed by an electronic logic unit to at least further: output said document data stored in said memory and said recognized document image to a display unit, when a character string of said document data displayed on said display unit is selected by a user; specify a character string related to said selected character string from said memory; display, on said display unit, document data in which said specified character string is distinguished from the other character strings; and display an area that includes at least said specified character string of said document data of said document image on said display unit.

3. The non-transitory computer-readable medium according to claim 1, with the program stored thereon to be executed by an electronic logic unit to at least further: recognize said inputted document; extract characters strings on said input document to be candidates of said logical elements stored in said logical-structure-model storing section and stores said character strings in said memory; extract plural combinations of character strings on said input document satisfying said relation among said logical elements stored in said logical-structure-model storing section; and store association of said character strings on said input document and said relation among said logical elements stored in said logical-structure-model storing section in said memory.

4. The non-transitory computer-readable medium according to claim 2, with the program stored thereon to be executed by an electronic logic unit to at least further: specify, when a character string of said input document data displayed on said display unit is selected by said user, other character strings to be candidates of said selected character string from said memory; and display said specified other character strings to be candidates on said display unit in association with said character string selected by said user.

5. The non-transitory computer-readable medium according to claim 1, with the program stored thereon to be executed by an electronic logic unit to at least further: recognize said inputted document; extract ranks of character strings on said input document to be candidates of said logical elements stored in said logical-structure-model storing section and stores said ranks in said memory in association with said character strings; extract plural combinations of character strings on said input document satisfying said relation among said logical elements stored in said logical-structure-model storing section; and store association of said character strings on said input document and said relation among said logical elements stored in said logical-structure-model storing section in said memory.

6. The non-transitory computer-readable medium according to claim 1, with the program stored thereon to be executed by an electronic logic unit to at least further: specify, when a character string of said input document data displayed on said display unit is selected by said user, other character strings to be candidates of said selected character string and ranks of said character strings from said memory; and display specified other character strings in high ranks to be candidates on said display unit in association with said character string selected by said user.

7. The non-transitory computer-readable medium according to claim 1, with the program stored thereon to be executed by an electronic logic unit to at least further: specify, when a character string of said input document data displayed on said display unit is corrected by said user, other character strings having said relation among said logical elements with said corrected character string from said memory; display, on said display unit, document data in which said specified other character strings having said relation among said logical elements are distinguished from other character strings not specified; and display an area that includes at least said specified character strings of said input document data of said document image on said display unit.

8. A document recognizing apparatus that includes a logical-structure-model storing section that stores a logical structure indicating logical elements in various documents and a relation among said logical elements, said document recognizing apparatus to recognize logical structure of an inputted and recognized document according to said logical structure stored in said logical-structure-model storing section, said document recognizing apparatus comprising: an electronic data storage memory that stores, as document data, character strings on said input document and association of said characters on said input document and a relation among logical elements stored in said logical-structure-model storing section; and a procedural programming module that extracts, with respect to a document image obtained by recognizing said inputted document, character strings coinciding with said logical elements stored in said logical-structure-model storing section, stores said character strings in said electronic data storage, extracts a combination of character strings on said input document satisfying said relation among said logical elements stored in said logical-structure-model storing section, and stores association of said character strings on said input document and said relation among said logical elements stored in said logical-structure-model storing section in said electronic data storage.

9. The document recognizing apparatus according to claim 8, further comprising: a display control programming module that outputs said document data stored in said electronic data storage and said recognized document image to a display unit, when a character string of said document data displayed on said display unit is selected by a user, specifies a character string related to said selected character string from said electronic data storage, displays document data in which said specified character string is distinguished from the other character strings on said display unit, and displays an area that includes at least said specified character string of said document data of said document image on said display unit.

10. A document recognizing method suitable for recognizing logical structure of an inputted and recognized document according to logical structure stored in a logical-structure-model storing section, said logical-structure-model storing section storing a logical structure indicating logical elements in various documents and a relation among said logical elements, said method comprising: storing in a first memory, as document data, character strings on said input document and association of said characters on the document and a relation among logical elements stored in said logical-structure-model storing section; extracting, with respect to a document image obtained by recognizing said document, character strings coinciding with said logical elements stored in said logical-structure-model storing section; storing said character strings in a second memory; extracting a combination of character strings on said document satisfying said relation among said logical elements stored in said logical-structure-model storing section; storing association of said character strings on said document and said relation among said logical elements stored in said logical-structure-model storing section in said second memory; outputting said document data stored in said second memory and said recognized document image to a display unit, when a character string of said document data displayed on said display unit is selected by a user; specifying a character string related to said selected character string from said second memory; displaying, on said display unit, document data in which said specified character string is distinguished from the other character strings; and displaying an area that includes at least said specified character string of said document data of said document image on said display unit.

* * * * *